(12) United States Patent
Verma et al.

(10) Patent No.: US 10,470,174 B2
(45) Date of Patent: Nov. 5, 2019

(54) TRIGGER FRAME IN WIRELESS LOCAL AREA NETWORK

(71) Applicant: QUALCOMM Incorporated, San Diego, CA (US)

(72) Inventors: Lochan Verma, San Diego, CA (US); Sameer Vermani, San Diego, CA (US); Bin Tian, San Diego, CA (US); Lin Yang, San Diego, CA (US); Raja Banerjea, San Jose, CA (US); Alfred Asterjadhi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/244,036

(22) Filed: Jan. 9, 2019

(65) Prior Publication Data

US 2019/0166590 A1 May 30, 2019

Related U.S. Application Data

(62) Division of application No. 15/587,135, filed on May 4, 2017, now Pat. No. 10,375,683.

(Continued)

(51) Int. Cl.
*H04W 72/04* (2009.01)
*H04W 52/24* (2009.01)
(Continued)

(52) U.S. Cl.
CPC ......... *H04W 72/042* (2013.01); *H04L 5/0023* (2013.01); *H04L 27/2613* (2013.01);
(Continued)

(58) Field of Classification Search
None
See application file for complete search history.

(56) References Cited

U.S. PATENT DOCUMENTS

| 8,843,069 B2 | 9/2014 | Borran et al. |
| 2013/0244715 A1 | 9/2013 | Kwon et al. |

(Continued)

FOREIGN PATENT DOCUMENTS

| EP | 2330843 A1 | 6/2011 |
| EP | 3188431 A2 | 7/2017 |

(Continued)

OTHER PUBLICATIONS

Bharadwaj A., et al., (QUALCOMM): "Power Control for UL MU; 11-16-0413-00-00ax-power-control-for-ul-mu" IEEE Draft; 11-16-0413-00-00AX-Power-Control-For-UL-MU, IEEE-SA Mentor, Piscataway, NJ USA, vol. 802.11ax, Mar. 14, 2016 (Mar. 14, 2016), XP068105331, pp. 1-19.

(Continued)

*Primary Examiner* — Anh Ngoc M Nguyen
(74) *Attorney, Agent, or Firm* — Arent Fox, LLP

(57) ABSTRACT

The present disclosure provides various aspects related to techniques for generating trigger frames, at an access point (AP), that reduce the overhead associated with triggering an uplink transmission from the wireless station (STA). Features of the present disclosure achieve this by, for example, utilizing a single per-user information field of the trigger to signal a plurality of random access resource units that may be allocated to the one or more STAs in the network. Such a technique is an improvement over the conventional system that require each random access resource unit to be signaled separately in a separate per-user information field (thus increasing the overhead). Additionally, aspects of the present disclosure allow the AP to effectively signal to the STA whether the one or more resources allocated to the at least one STA are a single user resource unit allocation or a multi-user resource unit allocation.

18 Claims, 15 Drawing Sheets

Related U.S. Application Data

(60) Provisional application No. 62/332,990, filed on May 6, 2016, provisional application No. 62/344,350, filed on Jun. 1, 2016, provisional application No. 62/361,968, filed on Jul. 13, 2016.

(51) Int. Cl.

| | | |
|---|---|---|
| *H04W 74/04* | (2009.01) | |
| *H04L 5/00* | (2006.01) | |
| *H04L 27/26* | (2006.01) | |
| *H04W 16/14* | (2009.01) | |
| *H04W 52/14* | (2009.01) | |
| *H04W 74/00* | (2009.01) | |
| *H04W 84/12* | (2009.01) | |

(52) U.S. Cl.
CPC ......... *H04W 16/14* (2013.01); *H04W 52/146* (2013.01); *H04W 52/242* (2013.01); *H04W 52/243* (2013.01); *H04W 74/04* (2013.01); *H04W 74/006* (2013.01); *H04W 84/12* (2013.01)

(56) References Cited

U.S. PATENT DOCUMENTS

| | | |
|---|---|---|
| 2014/0211766 A1 | 7/2014 | Zhao et al. |
| 2014/0226504 A1 | 8/2014 | Tavildar et al. |
| 2015/0071272 A1* | 3/2015 | Vermani ............... H04B 7/0452 370/338 |
| 2016/0119881 A1 | 4/2016 | Merlin et al. |
| 2016/0174079 A1 | 6/2016 | Wang et al. |
| 2016/0227533 A1 | 8/2016 | Josiam et al. |
| 2016/0242177 A1* | 8/2016 | Seok ................ H04W 72/0446 |
| 2016/0249303 A1 | 8/2016 | Kenney et al. |
| 2016/0262185 A1 | 9/2016 | Ghosh et al. |
| 2017/0033963 A1* | 2/2017 | Li ....................... H04L 27/2615 |
| 2017/0041171 A1 | 2/2017 | Li et al. |
| 2017/0127298 A1 | 5/2017 | Ryu et al. |
| 2017/0325178 A1 | 11/2017 | Verma et al. |
| 2017/0325202 A1 | 11/2017 | Verma et al. |
| 2018/0063867 A1 | 3/2018 | Sugaya et al. |

FOREIGN PATENT DOCUMENTS

| | | |
|---|---|---|
| WO | 2015137920 A1 | 9/2015 |
| WO | 2015186887 A1 | 12/2015 |
| WO | 2016011333 A1 | 1/2016 |
| WO | 2016032258 A2 | 3/2016 |

OTHER PUBLICATIONS

Fang Y., et al., "UL MU OFDMA Analysis; 11-15-0843-01-00ax-ul-mu-ofdma-analysis", ZTE, IEEE Draft; vol. 802.11ax, No. 1, Jul. 16, 2015, XP068098057, pp. 1-20.

International Search Report and Written Opinion—PCT/US2017/031349—ISA/EPO—dated Oct. 27, 2017.

Oteri K., et al., (Interdigital): "Power Control for Multi-User Transmission in 892.11ax; 11-16-0331-02-00ax-power-control-for-multi-user-transmission-in-892-11ax", IEEE Draft; 11-16-0331-02-00AX-Power-Control-For-Multi -User-Transmission-IN-892-11AX, IEEE-SA Mentor, Piscataway, NJ USA, vol. 892.11ax, No. 2, Mar. 16, 2016 (Mar. 16, 2016), XP068105201, pp. 1-22.

Partial International Search Report—PCT/US2017/031349—ISA/EPO—dated Sep. 7, 2017.

Stacey R., (Intel): "Proposed Draft Specification; 11-16-0024-01-00ax-proposed-draft-specification", vol. 802.11ax, No. 1, Mar. 3, 2016, XP068104773, pp. 1-160.

Venkateswaran S., (Broadcom) et al., "Single Stream Pilots in UL MU MIMO; 11-16-0089-01-00ax-single-stream-pilots-in-ul-mu-mimo", IEEE Draft; vol. 802.11ax, No. 1, Jan. 20, 2016, XP068104868, pp. 1-19.

\* cited by examiner

400

| 7 bits indices | Message | Number of entries | |
|---|---|---|---|
| 0000000 ~ 0100100 | Possible 26 RU cases in 80MHz | 37 | SU RU Allocation |
| 0100101 ~ 0110100 | Possible 52 RU cases in 80MHz | 16 | |
| 0110101 ~ 0111100 | Possible 106 RU cases in 80MHz | 8 | |
| 0111101 ~ 1000000 | Possible 242 RU cases in 80MHz | 4 | |
| 1000001 ~ 1000010 | Possible 484 RU cases in 80MHz | 2 | |
| 1000011 | 996 RU cases in 80MHz | 1 | |
| 1000100 | 160MHz/80+80MHz case | 1 | |
| 01000101 ~ 01001101 | Possible 106 RU cases in 80 MHz | 8 | MU RU Allocation |
| 01001110 ~ 01010010 | Possible 242 RU cases in 80 MHz | 4 | |
| 01010011 ~ 01010100 | Possible 484 RU cases in 80 MHz | 2 | |
| 01010101 | 996 RU cases in 80 MHz | 1 | |
| 01010110 | 160 MHz/80+80 MHz case | 1 | |
| Total | | 85 | |

FIG. 4

TRIGGER FRAME IN WIRELESS LOCAL AREA NETWORK

CROSS-REFERENCE TO RELATED APPLICATION(S)

This application is a divisional of U.S. application Ser. No. 15/587,135, entitled "TRIGGER FRAME IN WIRELESS LOCAL AREA NETWORK," and filed on May 4, 2017, which claims the benefit of U.S. Provisional Application Ser. No. 62/332,990, filed on May 6, 2016, U.S. Provisional Application Ser. No. 62/344,350, filed on Jun. 1, 2016, and U.S. Provisional Application Ser. No. 62/361,968, filed on Jul. 13, 2016, each entitled "TRIGGER FRAME IN WIRELESS LOCAL AREA NETWORK," which are expressly incorporated by reference herein in their entireties.

BACKGROUND

The deployment of wireless local area networks (WLANs) in the home, the office, and various public facilities is commonplace today. Such networks typically employ a wireless access point (AP) that connects a number of wireless stations (STAs) in a specific locality (e.g., home, office, public facility, etc.) to another network, such as the Internet or the like. A set of STAs can communicate with each other through a common AP in what is referred to as a basic service set (BSS). However, some WLAN network deployments may be dense (e.g., have a large number of STAs deployed within the coverage area of multiple APs), which may result in issues related to channel or medium usage. In other examples, the wireless network may be configured as an "ad-hoc" communication system in which terminals asynchronously communication directly with each other without use of any specific AP.

With multiple STAs and APs operating in a limited area, traffic collisions and interferences may occur among STAs and/or APs attempting to access the wireless medium. The traffic collisions and interferences may cause packets to be dropped where the transmitting device may be required to retransmit the same packet multiple times before successful transmission. However, because wireless STAs are usually small handheld devices operating on a limited power source (e.g., small battery), the STAs may need to balance consideration of power consumption against repeated transmission attempts. Various techniques and systems have been developed to minimize traffic collisions and power consumption of the STAs.

One such technique includes operating the STA, for example, in a power save operating mode. The power save operating mode allows the STAs to enter a sleep mode and wake-up periodically to listen to an AP's beacon. The AP may buffer packets for a particular STA if the target STA is in a sleep mode, and notifies the STA of the availability of pending packets in the beacon frame. When the STA wakes up, the STA may decode the beacon to determine if there are pending packets for the STA, and if so, transmit a trigger frame to the AP to initiate downlink transmission from the AP to deliver the buffered packets to the STA.

Alternatively, an AP, motivated by limiting traffic collisions, may similarly apply trigger frames to schedule uplink traffic from a plurality of STAs. However, conventional trigger frame techniques suffer from a number of drawbacks, including high overhead that includes redundant information for each STA separately. Further, the present techniques require the device receiving the trigger frame (e.g., STA) to decode the entire trigger frame regardless of whether or not the frame was directed to the decoding the STA. Such implementation may be highly inefficient and power intensive.

SUMMARY

The present disclosure provides various aspects related to techniques for generating trigger frames, at an AP, that reduce the overhead associated with triggering an uplink transmission from the STA. Aspects of the present disclosure achieve this by, for example, utilizing a single per-user information field of the trigger to signal a plurality of random access resource units that may be allocated to the one or more STAs in the network. Such a technique is an improvement over the conventional system that require each random access resource unit to be signaled separately in a separate per-user information field (thus increasing the overhead).

Additionally or alternatively, aspects of the present disclosure allow the AP to effectively signal to the STA whether the one or more resources allocated to the at least one STA are a single user resource unit allocation or a multi-user resource unit allocation. In other aspects, the AP may also identify one or more punctured channels indicated by the AP to the STA. For purpose of this disclose, the term "punctured channels" may include one or more channels that the AP indicates to the third party STAs (e.g., STAs that are not the intended recipients of the trigger frame), the channels that may be un-used in the uplink transmission. As will be discussed below, signaling this information prevents STAs from having to decode the remaining portion of the trigger frame if the STA may determine that the trigger frame is not addressed to it and the STA is not configured to use the multi-user (MU) multiple-input and multiple-output (MIMO) long training fields (LTF) mode of the resources.

In one aspect, a method for wireless communications at an AP is disclosed. The method may include determining, at an AP, whether to trigger at least one STA for uplink transmission and generating a trigger frame in response to a determination to trigger the at least one STA. The trigger frame may identify whether one or more resources allocated to the at least one STA are a single user resource unit allocation or a multi-user resource unit allocation. The method may include transmitting the trigger frame to the at least one STA.

In another aspect, an AP for wireless communications is disclosed. The AP may include a memory configured to store instructions for generating trigger frames and a processor communicatively coupled with the memory. The processor may be configured to execute the instructions to determine, at the AP, whether to trigger at least one STA for uplink transmission. The processor may further execute the instructions to generate a trigger frame in response to a determination to trigger the at least one STA. The trigger frame may identify whether one or more resources allocated to the at least one STA are a single user resource unit allocation or a multi-user resource unit allocation. The processor may further execute the instructions to transmit the trigger frame to the at least one STA.

In another aspect, another method for wireless communications is disclosed. The method may include receiving, at a STA, a trigger frame from an AP. The trigger frame may include a per-user information field. The method may further include decoding the trigger frame to identify whether one or more resources allocated to the STA are a single user resource unit allocation or a multi-user resource unit allocation. The method may further include communicating with the AP on the one or more resources allocated to the STA by the AP based on the decoding.

In another example, a STA for wireless communication is disclosed. The STA may include a memory configured to store instructions for processing trigger frames and a processor communicatively coupled with the memory. The processor may be configured to execute the instructions to receive, at a STA, a trigger frame from an AP. The trigger frame may include a per-user information field. The processor may further execute the instructions to decode the trigger frame to identify whether one or more resources allocated to the STA are a single user resource unit allocation or a multi-user resource unit allocation. The processor may further execute the instructions to communicate with the AP on the one or more resources allocated to the STA by the AP based on the decoding.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive

BRIEF DESCRIPTION OF THE DRAWINGS

FIG. 4 is a table that identifies one example of bit values that may be assigned to a resource unit allocation subfield of the per-user information field of the trigger frame to identify whether the one or more resources allocated to the at least one STA are the single user resource unit allocation or the multi-user resource unit allocation;

DETAILED DESCRIPTION

Figure 1:
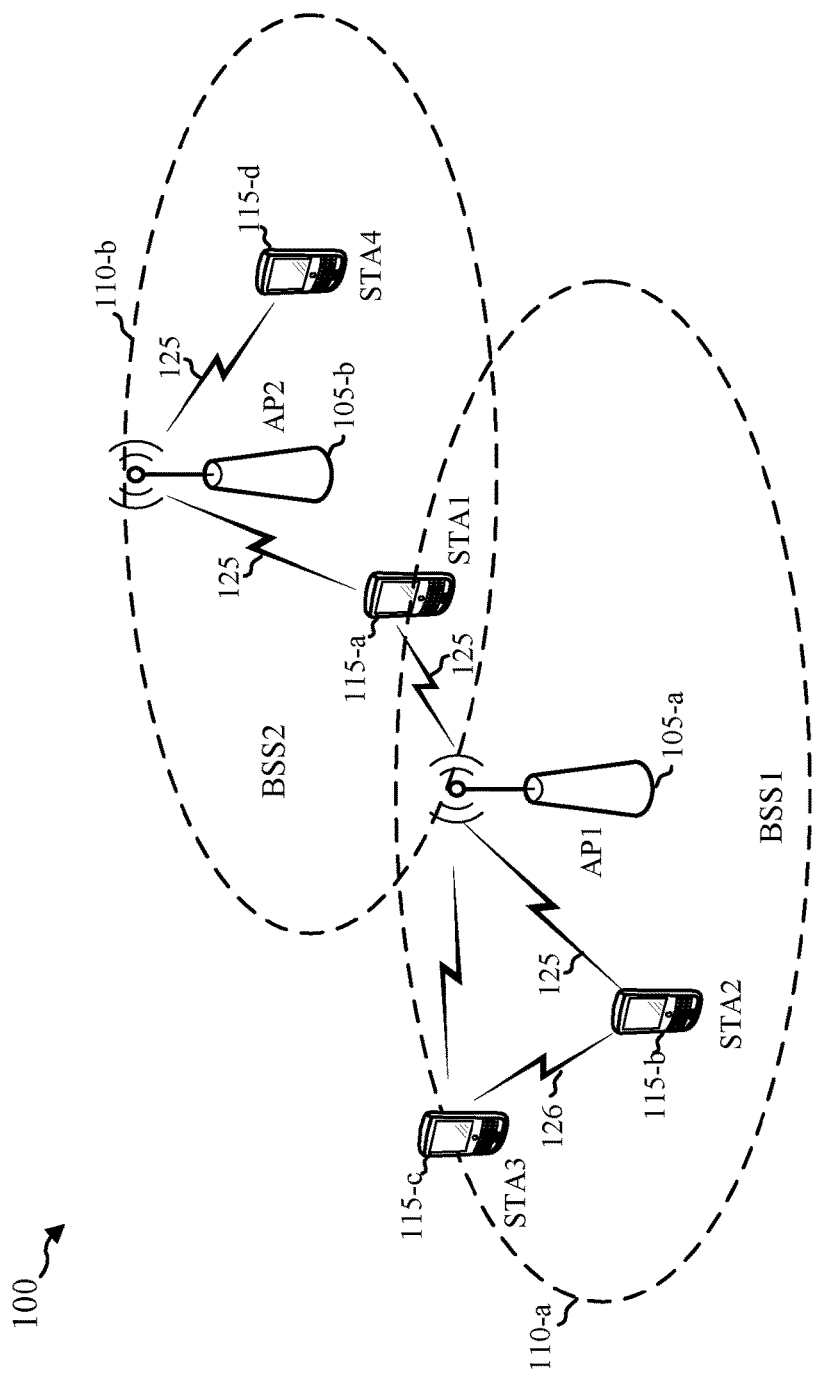
FIG. 1 is a conceptual diagram illustrating an example of a wireless local area network (WLAN) deployment in connection with various techniques described herein.

Various concepts will be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details. However, it will be apparent to those skilled in the art that these concepts may be practiced without these specific details. In some instances, well known structures and components are shown in block diagram form in order to avoid obscuring the various concepts presented throughout this disclosure.

As discussed above, the present techniques of generating and transmitting (e.g., broadcasting) trigger frames suffer from drawbacks associated with high overhead in terms of redundant data that is included in each frame and inadequate information signals that may increase power consumption of the STAs decoding the received trigger frames. Particularly, in the present technique, trigger frames may include one or more per-user information fields. In some aspects, the wild card transmission (or random access resource units) are included in the trigger frame. Thus, each per-user information subfield includes information about a separate and individual random access resource unit. However, there may be redundancy in the parameters being carried in various information fields (e.g., modulation and coding scheme (MCS), coding, etc.) that remain constant for each random access resource unit. Additionally, the present implementation of trigger frames fail to signal to the one or more STAs whether the allocated resources are single user (SU) or multi-user (MU) resource unit allocations. Such failure results in the STAs needing to decode the full trigger frame, which may waste valuable resources (e.g., power and processing).

Aspects of the present disclosure solve the above-identified problem by implementing a technique that allows a single per-user information field to be configured to carry information regarding multiple random access resource units by signaling the information that may be redundant across multiple random access resource units (e.g., MCS, coding, and DCM) only at the first instance. The compressed per-user information field used herein thus reduce the number of bits that are generated at the AP for the trigger frame, transmitted over the communication link, and decoded by the STAs. Additionally or alternatively, aspects of the present disclosure implement various options for recipient STA to determine whether its resource unit allocation unit is uplink (UL) SU/MU and accordingly to what MU MIMO LTF mode to use the particular resource unit. Such information is currently not signaled in the conventional trigger systems. However, by including this information in the trigger frame, aspects of the present disclosure may limit the number of bits that the STA may need to decode of the trigger frame.

Additionally or alternatively, aspects of the present disclosure provide advantages over conventional systems by further signaling the one or more punctured channels by the AP to the STAs. As noted above, punctured channels may include one or more channels that the AP indicates to the third party STAs (e.g., STAs that are not the intended recipients of the trigger frame), the channels that may be un-used in the uplink transmission. In some aspects of the present disclosure, a by-standing STA (e.g., a STA that is not the target of the trigger frame) may overhear the broadcast trigger frame signal from the AP and identify resources and timing that may be utilized to maximize the available bandwidth. In some aspects, based on decoding at least a portion of the trigger frame, the by-standing STAs may identify one or more channels that may be available (because the AP may prevent the target STAs to utilize the one or more punctured channels for uplink transmission). Thus, in some examples, the by-standing STA may utilize the identified one or more punctured channels to transmit its uplink packets. In some aspects, the preamble of HE trigger-based PPDU that includes HE-SIGA-A may be transmitted as response from multiple non-AP STAs that may be required to be identical for all non-AP STAs. This may be because absent adoption of the above-identified techniques, the AP may be unable to efficiently decode the HE trigger-based PPDUs. Because the 'Spatial Reus" is a field in the HE trigger-based PPDU, aspects of the present disclosure ensure that it is set correctly in order to be identical value by all non-AP STAs transmitted the HE trigger-based PPDU.

One additional problem addressed by aspects of the present disclosure include situations where one or more STA may not be knowledgeable regarding the basic service sets (BSS) color information of the AP associated with the STA. For purposes of the present disclosure, the term "BSS color" may refer to the BSS identification of a transmitter. In other words, the BSS color may identify the BSS that is the source of the packet. According to the IEEE 802.11 standards, in some implementations, an association identity (AID) is a value assigned by an AP to represent a 16-bit ID of a station (STA), and a basic service set identification (BSSID) is a 48-bit field of the same format as an IEEE 802 MAC address. The AID may be used to identify a STA and the BSSID may be used to identify a BSS. In wireless communications systems, BSS color information may be used to resolve contention based conflicts. For example, in some current WLAN systems, when a STA receives a packet on its primary channel, the STA decodes the received packet and backs off for at least the duration of the received packet. However, this reduces the chance to perform spatial reuse because if the packet is from an OBSS, the STA may still be able to transmit if the received packet from OBSS is below a certain signal strength level, e.g., a given clear channel assessment (CCA) level. On the other hand, if the packet is from its own BSS, the STA shall back off even if the signal strength is low. Thus, STAs identify the accurate BSS color information.

However, in some cases, the STA may not know the BSS color of the AP, such as when one or more unassociated STAs transmit using OFDMA backoff (OBO), or when the AP may change its BSS color information without the STA being aware of the change. In such situations, one or more STAs in the network may not receive the new color information and thus may be aware of the stale color information.

Additionally, in current systems, the BSS color information is not carried in the trigger frames transmitted by the AP. Thus, in some cases, the STAs may transmit high efficiency (HE) trigger physical layer convergence procedure (PLCP) protocol data unit (HE_Trig PPDU) with different BSS color than the current AP BSS color information.

Similarly, including BSS color in the trigger frame may be beneficial when the AP sends a trigger frame to at least one or more non-AP STAs. Generally, in such situations, non-AP STAs send simultaneous response using HE Trigger based PPDU. In some aspects, the preamble of HE trigger-based PPDU that includes HE-SIGA-A that is transmitted as response from multiple non-AP STAs may be required to be identical for all non-AP STAs because otherwise the AP would be unable to efficiently decode the HE trigger-based PPDUs. Because the BSS color is a field in the HE trigger-based PPDU, aspects of the present disclosure ensure that it is set correctly in order to be identical value by all non-AP STAs transmitted the HE trigger-based PPDU.

Aspects of the present disclosure resolve the above issue by adding the BSS color information to the trigger frames. In some examples, the BSS color information may be added to the common information field (see FIG. 3A, common info field 305) of the trigger frame that may be transmitted in the HE PPDU. In other examples, the BSS color information may be signaled using SS allocation field. For example, when AID12 value is zero ("0"), the SS allocation in the per user information field may be repurposed to indicate BSS color information associated with the AP. In alternative example, when AID12=0, type dependent per user information field of the trigger frame may be repurposed to indicate the BSS color information. In yet further example, when an AP is allocating resource units (RU) for OBO, then AP may allocate all RUs to AID=0. Thus, all the associated and unassociated STAs may transmit HE_Trig PPDU with a fixed BSS color (e.g., value 0 or 63). In accordance with aspects of the present disclosure, the AP, when changing the BSS color from the first value to the second value would first confirm STA reception of BSS color change before transmitting subsequent trigger frames. Additionally or alternatively, aspects of the present disclosure may also include adding an additional bit to the trigger frame common info field (FIG. 3A) to indicate whether the STA should use broadcast BSS color in HE_Trig packet.

FIG. 1 is a conceptual diagram 100 illustrating an example of a wireless local area network (WLAN) deployment in connection with various techniques described herein. The WLAN may include one or more access points (APs) and one or more mobile stations (STAs) associated with a respective AP. In this example, there are two APs deployed: AP1 105-a in basic service set 1 (BSS1) and AP2 105-b in BSS2, which may be referred to as an overlapping basic service set (OBSS). AP1 105-a is shown as having at least three associated STAs (STA1 115-a, STA2 115-b, and STA3 115-c) and coverage area 110-a, while AP2 105-b is shown having one associated STA4 115-d) and coverage area 110-b. The STAs 115 and AP 105 associated with a particular BSS may be referred to as members of that BSS. In the example of FIG. 1, the coverage area of API 105-a may overlap part of the coverage area of AP2 105-b such that STA1 115-a may be within the overlapping portion of the coverage areas. The number of BSSs, APs, and STAs, and the coverage areas of the APs described in connection with the WLAN deployment of FIG. 1 are provided by way of illustration and not of limitation.

In some examples, the APs (e.g., AP1 105-a and AP2 105-b) shown in FIG. 1 are generally fixed terminals that provide backhaul services to STAs 115 within its coverage area or region. In some applications, however, the AP may be a mobile or non-fixed terminal. The STAs (e.g., STA1 115-*a*, STA2 115-*b*, STA3 115-*c*, STA4 115-*d*) shown in FIG. 1, which may be fixed, non-fixed, or mobile terminals, utilize the backhaul services of their respective AP to connect to a network, such as the Internet. Examples of an STA include, but are not limited to: a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or any other suitable wireless apparatus requiring the backhaul services of an AP. An STA may also be referred to by those skilled in the art as: a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, user equipment (UE), or some other suitable terminology. An AP may also be referred to as: a base station, a base transceiver station, a radio base station, a radio transceiver, a transceiver function, or any other suitable terminology. The various concepts described throughout this disclosure are intended to apply to all suitable wireless apparatus regardless of their specific nomenclature.

Each of STA1 115-*a*, STA2 115-*b*, STA3 115-*c*, and STA4 115-*d* may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-*a* and AP2 105-*b* can include software applications and/or circuitry to enable associated STAs to connect to a network via communications link 125. The APs can send frames or packets to their respective STAs and receive frames or packets from their respective STAs to communicate data and/or control information (e.g., signaling). In some aspects, the AP1 105-*a* and/or AP2 105-*b* may transmit a trigger frame (see FIGS. 3A and 3B) to initiate uplink transmission from one or more STAs in the network. In some examples, the request to initiate the uplink transmission (by the AP via trigger frame) may be based on receiving a buffer status report from one or more STAs 115 that may identify the amount of data that each STA may be queued for uplink transmission. Thus, in order to avoid a condition where multiple STAs concurrently transmit their respective data packets to the AP, a condition that may result in bandwidth overload, the AP 105 may preemptively request the STA to initiate communicate on one or more assigned resources. The AP 105 may achieve this goal by utilizing a trigger frame that identifies the STAs 115 that AP 105 requests to initiate uplink transmission and assigns resources for the STA 115 to use when communicating with the AP 105.

Each of AP1 105-*a* and AP2 105-*b* can establish a communications link 125 with an STA that is within the coverage area of the AP. Communications link 125 can comprise communications channels that can enable both uplink and downlink communications. When connecting to an AP, an STA can first authenticate itself with the AP and then associate itself with the AP. Once associated, a communications link 125 may be established between the AP 105 and the STA 115 such that the AP 105 and the associated STA 115 may exchange frames or messages through a direct communications link 125. It should be noted that the wireless communication system, in some examples, may not have a central AP (e.g., AP 105), but rather may function as a peer-to-peer network between the STAs (e.g., STA2 115-*b* and STA3 115-*c* over communication link 125). Accordingly, the functions of the AP 105 described herein may alternatively be performed by one or more of the STAs 115.

While aspects of the present disclosure are described in connection with a WLAN deployment or the use of IEEE 802.11-compliant networks, those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. Thus, the various aspects presented throughout this disclosure for performing operations based on modifications and enhancements to dynamic sensitivity control may be applicable to any suitable wireless network regardless of the coverage range and the wireless access protocols utilized.

In some aspects, one or more APs (105-*a* and 105-*b*) may transmit on one or more channels (e.g., multiple narrowband channels, each channel including a frequency bandwidth) a beacon signal (or simply a "beacon"), via a communications link 125 to STA(s) 115 of the wireless communication system, which may help the STA(s) 115 to synchronize their timing with the APs 105, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In an aspect, a device (e.g., APs 105 and/or STAs 115) may include one or more components for performing various functions described in the present disclosure. For example, an AP 105 may include a trigger frame generation component 705 (not shown—see e.g., FIG. 7) to perform procedures (e.g., methods 500 and 600 in FIGS. 5 and 6, respectively) related to generating one or more trigger frames in accordance with aspects of the present disclosure. Additionally or alternatively, the STA 115 may include a trigger frame decoding component 1005 (not shown—see e.g., FIG. 10) to perform procedures (e.g., methods 800 and 900 in FIGS. 8 and 9, respectively) related to decoding one or more trigger frames in accordance with aspects of the present disclosure.

Figure 2:
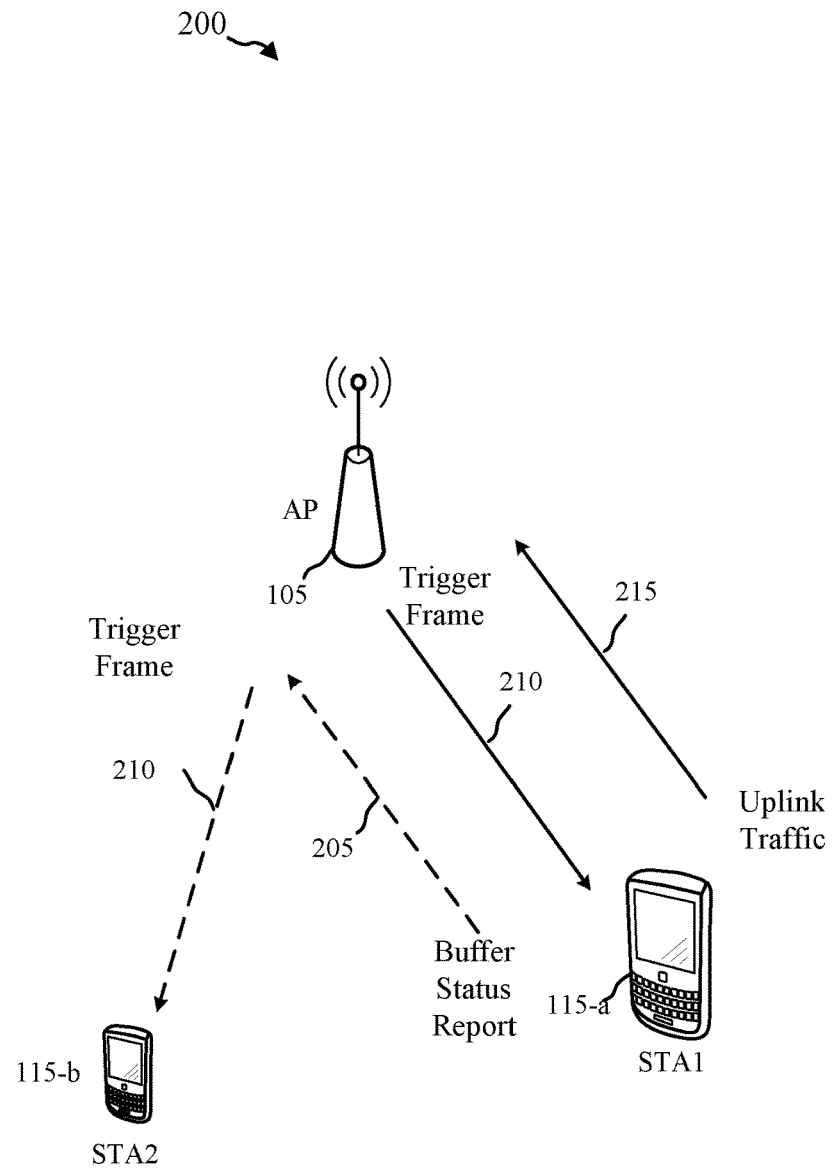
FIG. 2 is a more detailed implementation diagram illustrating an example of a WLAN deployment in connection with various techniques described herein.

FIG. 2 is a conceptual diagram 200 illustrating an example of a wireless local area network (WLAN) deployment in connection with various techniques described herein. The diagram 200 may include one or more STAs 115 and AP 105 as described with reference to FIG. 1. In some aspects, the issuance of the trigger frame 210 by the AP 105 may be based on a buffer status report 205 received by the AP 105. In one or more examples, the buffer status report 205 may indicate the level of pending data queued at the STA 115 awaiting transmission opportunity (e.g., access to the medium) to transmit traffic to the AP. Thus, the buffer status report 205 may include information, such as the fill level of the buffer (e.g., amount of data stored in the buffer) and the capacity of the buffer (such that the AP can determine whether the STA 115 is close to capacity before transmitting). Particularly, in order to avoid congestion on the network, the AP 105 may periodically monitor the buffer status of a plurality of STAs 115 and during periods of low network usage (e.g., available bandwidth), the AP 105 may issue trigger frame(s) 210 to one or more STAs 115 to solicit information or data scheduled for uplink transmission.

Thus, by implementing a proactive trigger technique, the AP 105 may be configured to avoid conditions where a number of STAs 115 may concurrently transmit their respective data on the network, and thus burden the network. In one more examples, the AP 105, in the trigger frame 210, may identify resources (e.g., frequency, MCS, coding, DCM, etc.) that the STA1 115-a should utilize to transmit its uplink traffic. In one or more aspects, the trigger frame may include a common information field that also identifies one or more punctured channels that the STA1 115-a will avoid utilizing for the uplink transmission. For example, in 80 Mhz PPDU, the AP 105 may identify one or more 20 Mhz channels that may not be ideal for uplink transmission. As such, the AP 105 may signal the identified one or more 20 Mhz channels that should be "punctured" (e.g., not utilized by the STA1 115-a) for its uplink transmissions. Upon decoding the received trigger frame 210, the STA 115 may respond with the uplink traffic 215 to the AP 105 over the assigned resources (and avoiding the one or more punctured channels).

In some aspects, another STA in the coverage area of the AP 105 (e.g., STA2 115-b) may overhear the trigger frame 210 and decode at least a portion of the trigger frame to identify the one or more punctured channels. By identifying the one or more punctured channels (e.g., channels that the STA1 115-a would not use for transmission), the by-standing STA 115-b may maximize the available resources by transmitting its uplink traffic on the one or more punctured channels. In some examples, indication of the punctured channels in the trigger frame may be achieved either by utilizing the bandwidth subfield of the trigger frame or by including it in the spatial reuse subfield of the common information field. In some aspects, the STA2 115-b may also transmit at a specified transmit power as to avoid interference above acceptable level at the AP 105. Thus, in some examples, a specific value of spatial reuse sub-field may be used to convey an unused channel to the third party STAs (e.g., STA2 115-b). This may be equivalent to having SR field which is calculated based on a very high value of tolerable interference (e.g., conditions where an unused channel can tolerate a much higher level of interference at the receiver of the AP).

Thus, in one or more examples, the by-standing STA 115-b may calculate the transmit power of the STA2 115-b by determining the transmit power of the AP and the acceptable interference level of the AP. In some aspects, the transmit power of the STA 115-b may be determined based on the downlink pathloss measurement of the trigger frame from the AP 105 to the STA2 115-b. In other aspects, the acceptable interference level of the AP 105 may be determined based on decoding a spatial reuse subfield of a common information field of the trigger frame. In some examples, because the punctured channel may be unoccupied (e.g., STA1 115-a may not be transmitting on the punctured channels), the acceptable interference level on the punctured channel may be higher than non-punctured channels. Thus, the spatial reuse subfield may be set to indicate that a high interference may be tolerated by the AP. As such, the STA2 115-b may calculate a transmit power that the STA2 115-b should utilize in order to minimize interference at the AP 105. In some aspects, the STA2 115-b may transmit its uplink packets to the AP 105 on the one or more punctured channels at the calculated transmit power of the STA115-b.

In some examples, the STA1 115-a and STA2 115-b may be high efficiency (HE) STAs (e.g., STAs operating in accordance with IEEE 802.11ax or later specifications). In other examples, the AP 105 may also be classified as HE AP. In some examples, the AP 105 first identifies a BSS color information and inserts the BSS color information in all the packets sent by the HE AP 105 to the STAs 115, including the trigger frame 210. In response, the STAs 115 may add the BSS color information identified by the AP 105 in the trigger frame into the packets it sends out. Accordingly, any AP 105 and STAs 115 in the network that receives the packet 215 from the STA 115-a can extract the BSS color information to determine whether the packet sent from the STA 115 is within the AP's BSS.

In one or more examples, the AP 105 may transmit the trigger frame 210 in a HE PPDU when AID12=0 or BSS color change occurs. Such implementation would require no change in the trigger frame format. In other examples, the SS allocation field when AID12=0 would be used to indicate the BSS color. Although such implementation does not increase the trigger frame length, the one drawback of such system may be that SS allocation field could otherwise have been used to indicate number of consecutive RU allocations used for OBO. Thus, the AP 105 may make an opportunistic determination of when to utilize SS allocation field to signal the BSS color change.

In yet further examples, the BSS color information may be added to the common information field (see FIG. 3A) of the trigger frame 210. Such implementation includes an advantage that color for HE_Trig PPDU is present in the trigger frame 210. However, such implementation may increase the trigger frame by 8 bits for added overhead. In other aspects, BSS color information signaling may be type depended per user information field for basic trigger. Alternatively, buffer status report when AID12=0 may indicate the BSS color information to the one or more STAs 115. Such implementation alleviates the problem of the increase in trigger frame length accomplished by earlier solutions. However, this implementation may not allow A-MPDU and multi-TID transmission for OBO. Additionally, such an implementation may increase the length of the trigger frame for buffer status report(s).

In some examples, when allocating resource units (RUs) for OBO, AP may allocate all RUs to AID=0 (OBO) such that associated and unassociated STAs transmit HE_Trig PPDU with a fixed BSS color (e.g., BSS color which indicates no color). However, when changing BSS color, AP 105 may be required to confirm that one or more STAs 115 have received BSS color change information before transmitting trigger frame 210. Such system may cause a delay in the STAs using the received new BSS color and may not resolve the issue of unassociated STAs using OBO. Additionally or alternatively, aspects of the present disclosure may also include adding an additional bit to the trigger frame common info field (FIG. 3A) to indicate whether the STA should use broadcast BSS color in HE_Trig packet. In this aspects, the AP may use this as a mode to allow unassociated STA(s) to use OBO and may also be used during BSS color change. However, by adding the one additional bit, the AP 105 may be required to consider the implications of modifying the current trigger frame formats.

In consideration of the various solutions identified above, aspects of the present disclosure contemplate using one or more methods that support indicating the BSS color in the trigger frame. Thus, in some examples, the AP 105 may transmit the trigger frame 210 in a HE PPDU when AID12=0 or BSS color change occurs. In other examples, SS allocation field when AID12=0 would indicate the BSS color. In yet further examples, BSS color information may be added to the common info field of the trigger frame 210. The AP 105 may dynamically determine the optimal signaling technique in consideration of various drawbacks and benefits identified above based on analysis of each situation.

Figure 3A:
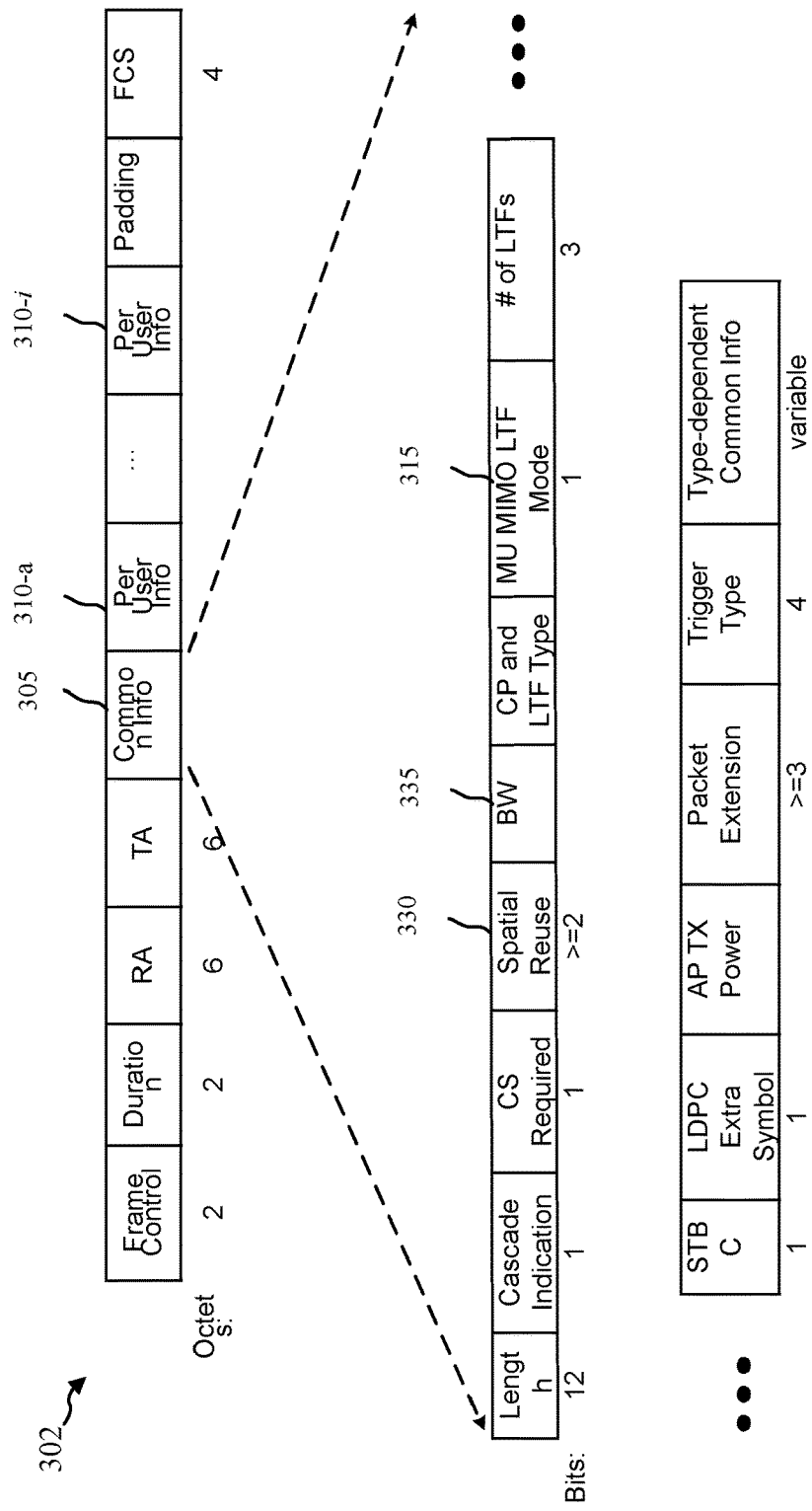
FIG. 3A is a trigger frame and a common information field of the trigger frame in accordance with various aspects of the present disclosure.
Figure 3B:
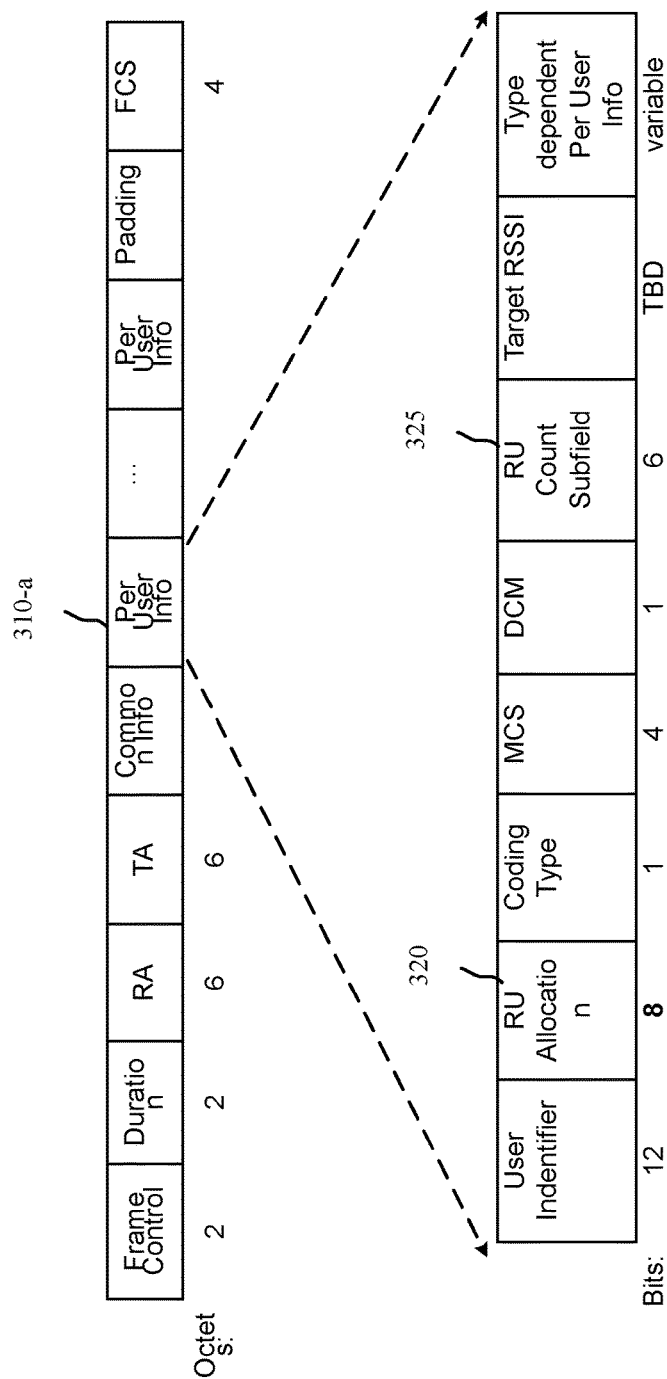
FIG. 3B is a trigger frame and a per-user information field of the trigger frame in accordance with various aspects of the present disclosure.

FIGS. 3A and 3B are a trigger frame 302 in accordance with various aspects of the present disclosure. For example, FIG. 3 shows the trigger frame and details of the subfields of the common information field, while FIG. 3B shows the trigger frame and details of the subfields of the per-user information field. In some examples, the trigger frame 302 may include a common information field 305 that may include information shared by a plurality of the STAs 115 on the network. The trigger frame 302 may also include a per-user information field 310 that may include information specific to each STA. As noted above, generally each per-user information field 310 may include information regarding different random access resource unit allocation by the AP. However, there may be significant overlap between information between multiple per-user information fields 310 (e.g., MCS, coding, DCM, etc.). In order to minimize the generation and transmission of redundant data (and decoding at the receiver side), aspects of the present disclosure provide a method of allowing a single per-user information field to carry information regarding plurality of random access resource units (described in more detail with reference to FIGS. 5 and 8). Therefore, where previously a large number of per-user information subfields 310-a (through 310-i) may have been required to signal a plurality of random access resource units, such information may be compacted and signaled in a significantly reduced number of per-user information field where only non-duplicative information is included in various per-user information fields.

Additionally or alternatively, features of the present disclosure utilize the combination of the common information field 305 and the per-user information field 310 to signal to the STA whether its resource unit allocation units (e.g., one or more resources allocated to the STA by the AP) are single user resource units or multi-user resource units. In some examples, the MU MIMO LTF mode subfield 315 of the common information field 305 may be used to identify the MU MIMO LTF mode that the STA may use for the one or more allocated resources. Thus, in some aspects, the AP may set the MU MIMO LTF mode subfield 315 to a single-stream pilot based on a determination that at least one of the one or more resources allocated to the at least one STA is a single-user resource unit allocation. In other examples, the AP may set MU MIMO LTF mode to a masked LTF sequence or single-stream pilots based on determining that none of the one or more resources allocated to the at least one STA are a single-user resource unit allocation. As noted above, the AP 105 may generate a trigger frame that identifies one or more punctured channels by the AP in either the spatial reuse subfield 330 or the bandwidth subfield 335 of the common information field. In some aspects, generating the trigger frame may include determining that one or more resources allocated to the at least one STA are for OFDMA backoff (OBO), and allocating the one or more resources to association identifier (AID) a value of zero. Accordingly, the AP may receive from the at least one STA (e.g., associated and/or unassociated STAs) a high efficiency (HE) trigger physical layer convergence procedure protocol data unit (HE_Trig PPDU) with a fixed basic service set (BSS) color information in response to the transmission of the trigger frame.

In some aspects, utilization of the bandwidth subfield 335 may require the 2 bit bandwidth subfield 335 to be extended to three bits (by omitting utilization of the reserve bit in the trigger frame). Alternatively, by utilizing the spatial reuse subfield 330, the AP may utilize the four (4) bits per 20 Mhz/40 Mhz channel to include sixteen different and unique values. For example, one value may indicate that the spatial reuse transmission is disallowed. Another value may indicate that HE_Trig PPDU transmission may not be occurring on a specified 20/40 MHz channel. In yet further examples, the spatial reuse subfield 330 may be used to indicate acceptable interference level of the AP 105.

For example, for a bandwidth of 20 MHz, the spatial reuse bits B0:B3 may be SRP values for 20 MHz channel, bits B4:B7, B8:B11, and B12:B15 may carry identical copies of B0:B3. For bandwidth of 40 MHz, the spatial reuse bits B0:B3 and B4:B7 may be SRP values for first and second 20 MHz channel, respectively for instance. In such case, bits B8:B11 and B12:B15 may be copies of B0:B3 and B4:B7 respectively. In other examples where the bandwidth may be 80 MHz, the spatial reuse bits B0:B3, B4:B7, B8:B11, and B12:B15 may be SRP values for the first, second, third, and fourth 20 MHz channels respectively. For the bandwidth of 160 MHz, the spatial reuse bits B0:B3, B4:B7, B8:B11, and B12:B15 may be SRP values for the first, second, third, and fourth 40 MHz channel. The first, second, third, and fourth 20/40 MHz channel may be arranged in increasing order of absolute frequency.

FIG. 4 is a table 400 that identifies one example of bit values that may be assigned to a resource unit allocation subfield of the per-user information field of the trigger frame to identify whether the one or more resources allocated to the at least one STA are the single user resource unit allocation or the multi-user resource unit allocation.

As discussed above, aspects of the present disclosure implement techniques for recipient STA to determine whether its resource unit allocation unit is an UL SU or UL MU. Further the STA may be configured to determine the MU MIMO LTF mode to use for each of the one or more particular resource units allocated to the STA by the AP. By including this information in the trigger frame, aspects of the present disclosure may limit the number of bits that the STA may need to decode of the trigger frame. As illustrated in table 400, the seven (7) bit indices of the resource unit allocation subfield (see FIG. 3B, RU Allocation 320) may utilize the identified bit values to convey the identified message to the STA based on the determination whether at least one or more allocated resource units are SU or MU.

Figure 5:
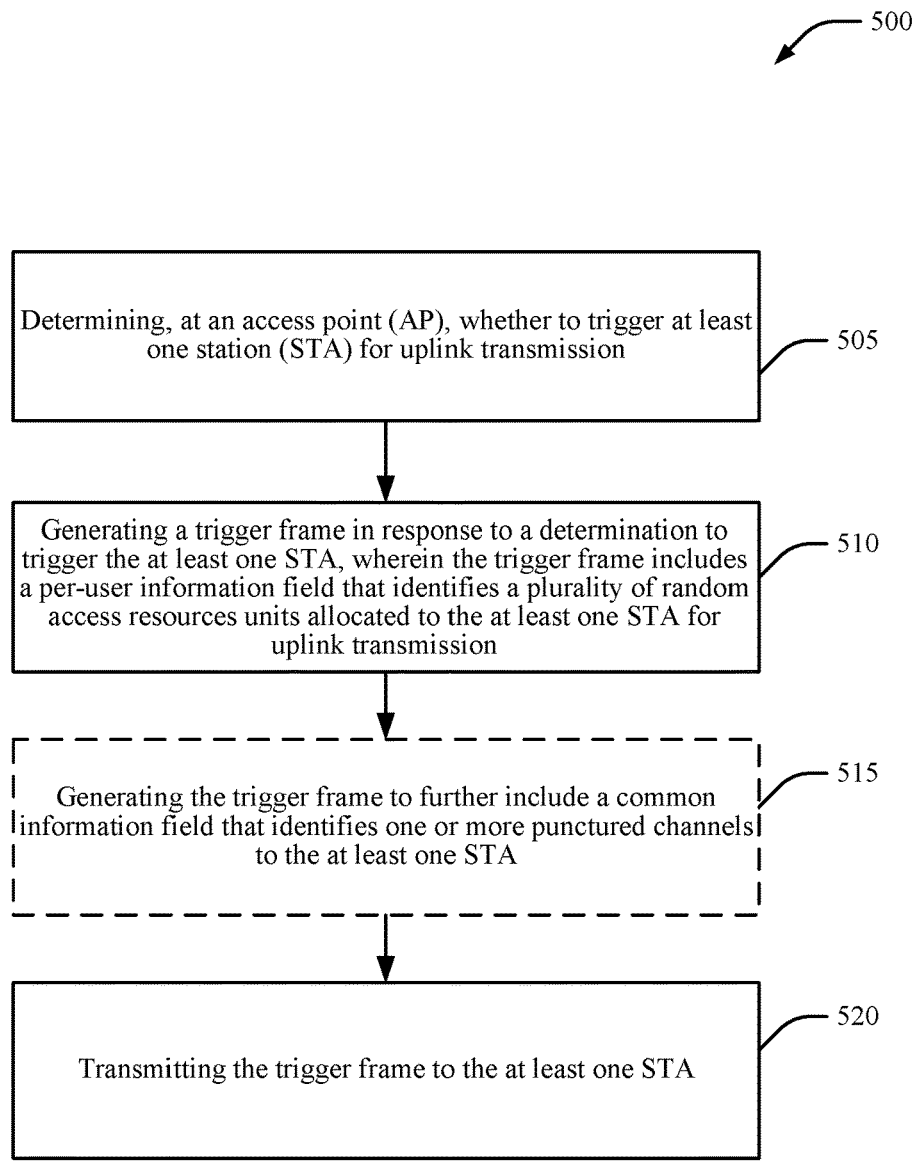
FIG. 5 is a flowchart of an example method of generating a trigger frame, at an AP, with compressed per-user information field for random access allocations.

FIG. 5 is a flowchart of an example method 500 of generating a trigger frame with compressed per-user information field for random access allocations. The method 500 may be performed by an AP 105 as described with reference to FIGS. 1, 2, and 7. Although the method 500 is described below with respect to the elements of the AP 105, other components may be used to implement one or more of the steps described herein.

At block 505, the method may include determining, at an AP, whether to trigger at least one STA for uplink transmission. In some examples, determining whether to trigger at least one STA may be based on receiving a buffer status report from the STA identifying the amount of data that the at least one STA has scheduled for transmission to the AP. In other examples, the AP may issue the trigger frame to request information (e.g., buffer status report or other information associated with the STA). Aspects of block 505 may be performed by the trigger frame generation component 705 described with reference to FIG. 7.

At block 510, the method may include generating a trigger frame in response to a determination to trigger the at least one STA. The trigger frame may include a per-user information field that identifies a plurality of random access resource units allocated to the at least one STA for uplink transmission. In accordance with various aspects of the present disclosure, a single per-user information field may be used to identify the plurality of random access resource units, thus alleviating the overhead caused by the redundancy of the current systems.

In one or more examples, the per-user information field that identifies the plurality of random access resource may comprise assigning a starting index of the plurality of random access resource units to a resource unit allocation subfield in the per-user information field of the trigger frame. In some aspects, the plurality of random access resource units may be consecutive K number of resource units of equal size, wherein K is an integer (e.g., K=1, 2, 3, 4 . . . n). A value of K=1 may be a single random access resource unit signaled using the per-user information field. In one or more examples, a value of K may be signaled to the at least one STA by the AP in a resource unit count subfield (see FIG. 3B, RU Count Subfield 325) in the per-user information field of the trigger frame. In some aspects, the resource unit count subfield may be repurposed spatial stream allocation subfield of the trigger frame. For example, when K=1, the resource unit count subfield may be understood to be spatial stream allocation field. Aspects of block 510 may be performed by compressed random access allocation component 715 described with reference to FIG. 7.

At block 515, the method may optionally include generating the trigger frame to include a common information field that identifies one or more punctured channels to the at least one STA 115. In some aspects, the information associated with the one or more punctured channels may be included in a spatial reuse subfield of the common information field to identify whether spatial reuse transmission is disallowed. Aspects of block 515 may be performed by punctured channel component 725 described with reference to FIG. 7.

At block 520, the method may include transmitting the trigger frame to the at least one STA. In some examples, the trigger frame may identify the one or more STAs that the AP 105 requests to initiate uplink transmission. Additionally or alternatively, the trigger frame may also include resource allocation information for the STAs to utilize for uplink transmission. Aspects of the block 520 may be performed by combination of the modem 714 and transceiver 702 described with reference to FIG. 7.

Figure 6A:
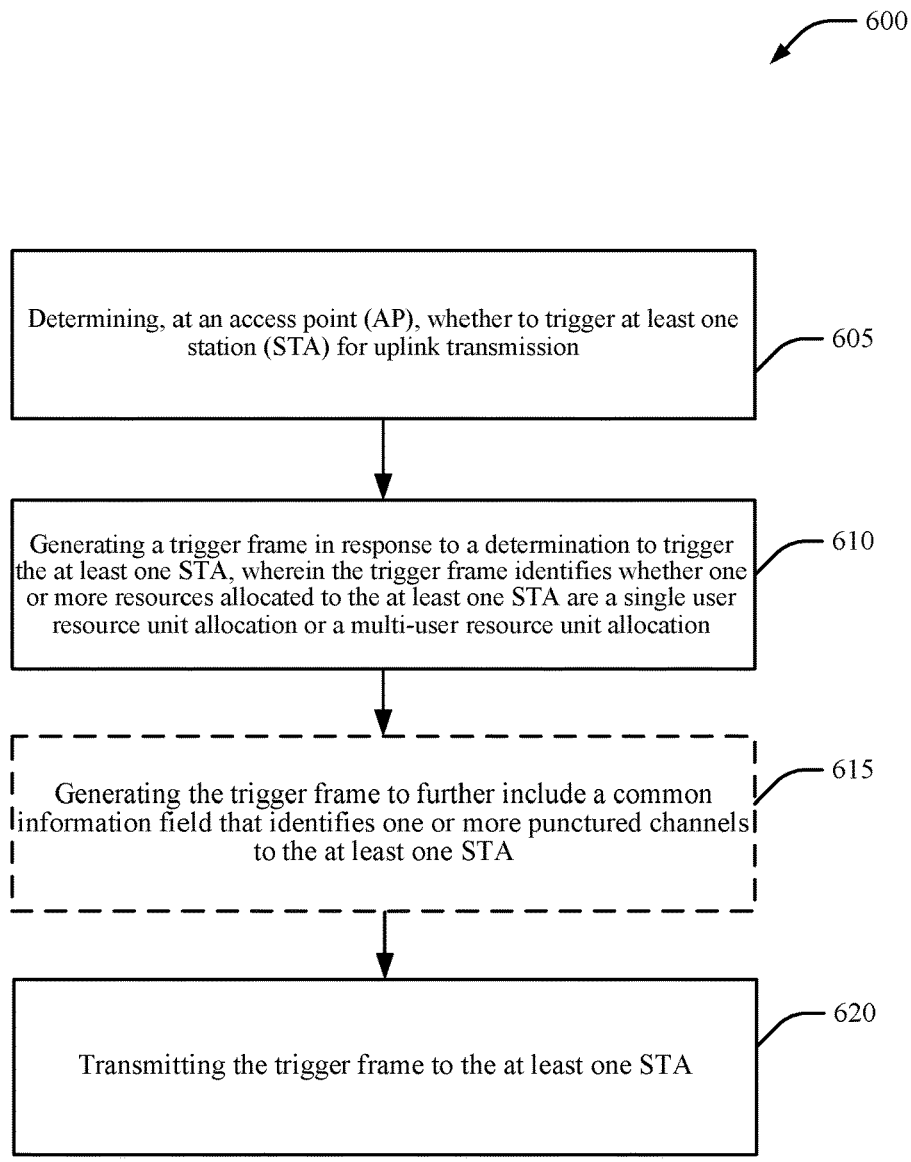
FIG. 6A is a flowchart of an example method of generating a trigger frame, at an AP, for long training fields (LTF) mode signaling that identifies whether one or more resources allocated to the at least one STA are a single user resource unit allocation or a multi-user resource unit allocation.

FIG. 6A is a flowchart of an example method 600 of generating a trigger frame long training fields (LTF) mode signaling that identifies whether one or more resources allocated to the at least one STA are a single user resource unit allocation or a multi-user resource unit allocation. The method 600 may be performed by an AP 105 as described with reference to FIGS. 1, 2, and 7. Although the method 600 is described below with respect to the elements of the AP 105, other components may be used to implement one or more of the steps described herein.

At block 605, the method may include determining, at an AP, whether to trigger at least one STA for uplink transmission. Similar to features of FIG. 5, in some examples, determining whether to trigger at least one STA may be based on receiving a buffer status report from the STA identifying the amount of data that the at least one STA has scheduled for transmission to the AP. In other examples, the AP may issue the trigger frame to request information (e.g., buffer status report or other information associated with the STA). Aspects of block 605 may be performed by the trigger frame generation component 705 described with reference to FIG. 7.

At block 610, the method may include generating a trigger frame in response to a determination to trigger the at least one STA. In some examples, the trigger frame identifies whether one or more resources allocated to the at least one STA are a single user resource unit allocation or a multi-user resource unit allocation. In some aspects, the AP may set a multi-user (MU) multiple-input and multiple-output (MIMO) LTF mode (see FIG. 3A, MU MIMO LTF Mode 315) subfield to a single-stream pilot based on a determination that at least one of the one or more resources allocated to the at least one STA is a single-user resource unit allocation. In one or more examples, the MU MIMO LTF mode 315 may be set in a common information field of the trigger frame. In other examples, the AP may set MU MIMO LTF mode to a masked LTF sequence or single-stream pilots based on determining that none of the one or more resources allocated to the at least one STA are a single-user resource unit allocation.

In some examples, identifying whether the one or more resources allocated to the at least one STA are the single user resource unit allocation or the multi-user resource unit allocation may comprise assigning a bit value (see FIG. 4, 7 bits indices) to a resource unit allocation subfield (see FIG. 3B, RU Allocation 320) that signals the single user resource unit allocation or the multi-user resource unit allocation for the at least one STA in a per-user information field of the trigger frame. In other examples, identifying whether the one or more resources allocated to the at least one STA are the single user resource unit allocation or the multi-user resource unit allocation may comprise adding a configurable bit to a per-user information field of the trigger frame that indicates whether the one or more resources allocated include the single user resource unit allocation or the multi-user resource unit allocation. For example, an additional bit may be added to the per-user information field of the trigger frame (either before or after the User identifier subfield and/or RU Allocation subfield—see FIG. 3B). Aspects of the block 610 may be performed by LTF signaling component 720 described with reference to FIG. 7.

At block 615, the method may optionally include generating the trigger frame to include a common information field that identifies one or more punctured channels to the at least one STA 115. In some aspects, the information associated with the one or more punctured channels may be included in a spatial reuse subfield of the common information field to identify whether spatial reuse transmission is disallowed. Aspects of block 615 may be performed by punctured channel component 725 described with reference to FIG. 7.

At block 620, the method may include transmitting the trigger frame to the at least one STA. In some examples, the trigger frame may identify the one or more STAs that the AP 105 requests to initiate uplink transmission. Additionally or alternatively, the trigger frame may also include resource allocation information for the STAs to utilize for uplink transmission. Aspects of the block 620 may be performed by combination of the modem 714 and transceiver 702 described with reference to FIG. 7.

Figure 6B:
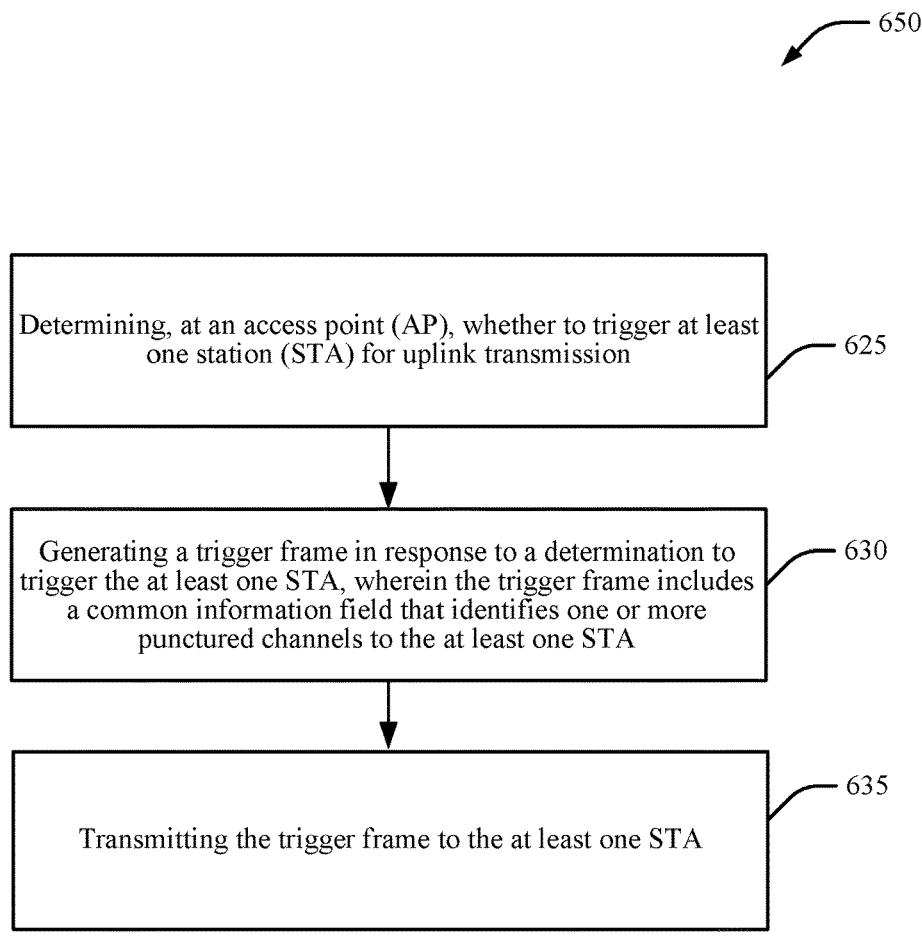
FIG. 6B is a flowchart of an example method of generating a trigger frame that identifies one or more punctured channels by the AP.

FIG. 6B is a flowchart of an example method 650 of generating a trigger frame that identifies one or more punctured channels by the AP to the STA. The method 650 may be performed by an AP 105 as described with reference to FIGS. 1, 2, and 7. Although the method 650 is described below with respect to the elements of the AP 105, other components may be used to implement one or more of the steps described herein.

At block 625, the method may include determining, at an AP, whether to trigger at least one STA for uplink transmission. Similar to features of FIG. 6A, in some examples, determining whether to trigger at least one STA may be based on receiving a buffer status report from the STA identifying the amount of data that the at least one STA has scheduled for transmission to the AP. In other examples, the AP may issue the trigger frame to request information (e.g., buffer status report or other information associated with the STA). Aspects of block 625 may be performed by the trigger frame generation component 705 described with reference to FIG. 7.

At block 630, the method may include generating a trigger frame in response to a determination to trigger the at least one STA. In some examples, the trigger frame may include a common information field that identifies one or more punctured channels to the at least one STA. In some aspects, the AP may set the spatial reuse subfield (see FIG. 3A, element 330) to identify the one or more punctured channels. Aspects of the block 640 may be performed by punctured channel component 725 described with reference to FIG. 7.

At block 635, the method may include transmitting the trigger frame to the at least one STA. In some examples, the trigger frame may identify the one or more STAs that the AP 105 requests to initiate uplink transmission. Additionally or alternatively, the trigger frame may also include resource allocation information for the STAs to utilize for uplink transmission. In some aspects, the punctured channels may include one or more channels that the AP indicates to the third party STAs (e.g., STAs that are not the intended recipients of the trigger frame), the channels that may be un-used in the uplink transmission. Aspects of the block 635 may be performed by combination of the modem 714 and transceiver 702 described with reference to FIG. 7.

Figure 6C:
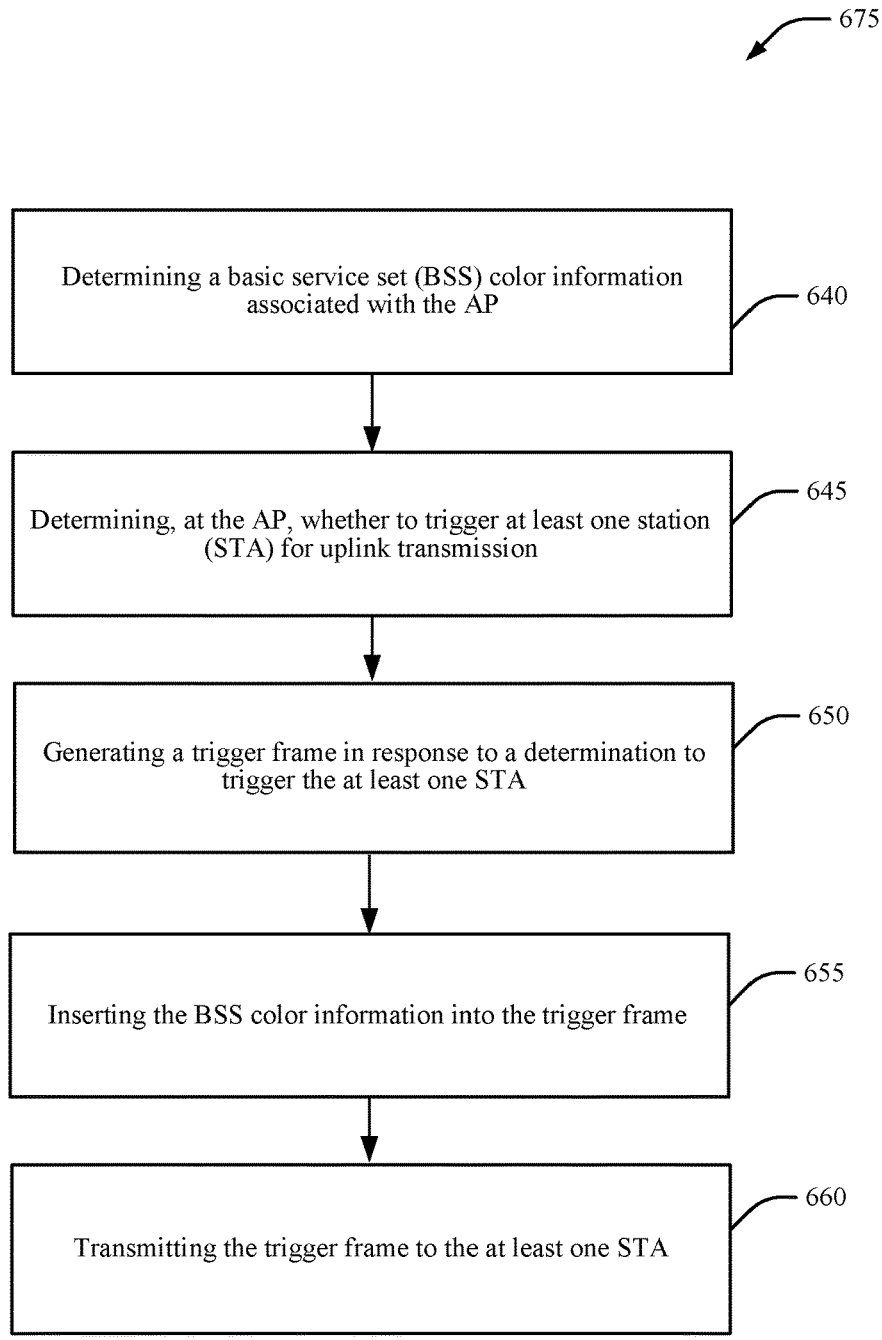
FIG. 6C is a flowchart of an example method of generating a trigger frame that identifies the BSS color information of the AP to the one or more STAs.

FIG. 6C is a flowchart of an example method 675 of generating a trigger frame that identifies one or more BSS color information associated with the AP to the STA. The method 675 may be performed by an AP 105 as described with reference to FIGS. 1, 2, and 7. Although the method 675 is described below with respect to the elements of the AP 105, other components may be used to implement one or more of the steps described herein.

At block 640, the method may include determining a basic service set (BSS) color information associated with the AP. Aspects of block 640 may be performed by the BSS color identification component 708 described with reference to FIG. 7.

At block 645, the method may include determining, at the AP, whether to trigger at least one STA for uplink transmission. Aspects of block 645 may be performed by the trigger frame generation component 705 described with reference to FIG. 7.

At block 650, the method may include generating a trigger frame in response to a determination to trigger the at least one STA. Aspects of block 650 may also be performed by the trigger frame generation component 705 described with reference to FIG. 7.

At block 655, the method may include inserting the BSS color information into the trigger frame. In some examples, the BSS color information may be inserted into a common information field of the trigger frame. In other examples, the BSS color information may be signaled to the at least one STA when an association identifier (AID) is assigned a value of zero in a SS allocation field value of the trigger frame.

At block 660, the method may include transmitting the trigger frame to the at least one STA. In some examples, transmitting the trigger frame to the at least one STA may include transmitting the trigger frame in a high efficiency (HE) PHY layer convergence procedure (PLCP) protocol data unit (PPDU). Aspects of block 660 may also be performed by combination of the modem 714 and transceiver 702 described with reference to FIG. 7.

Figure 7:
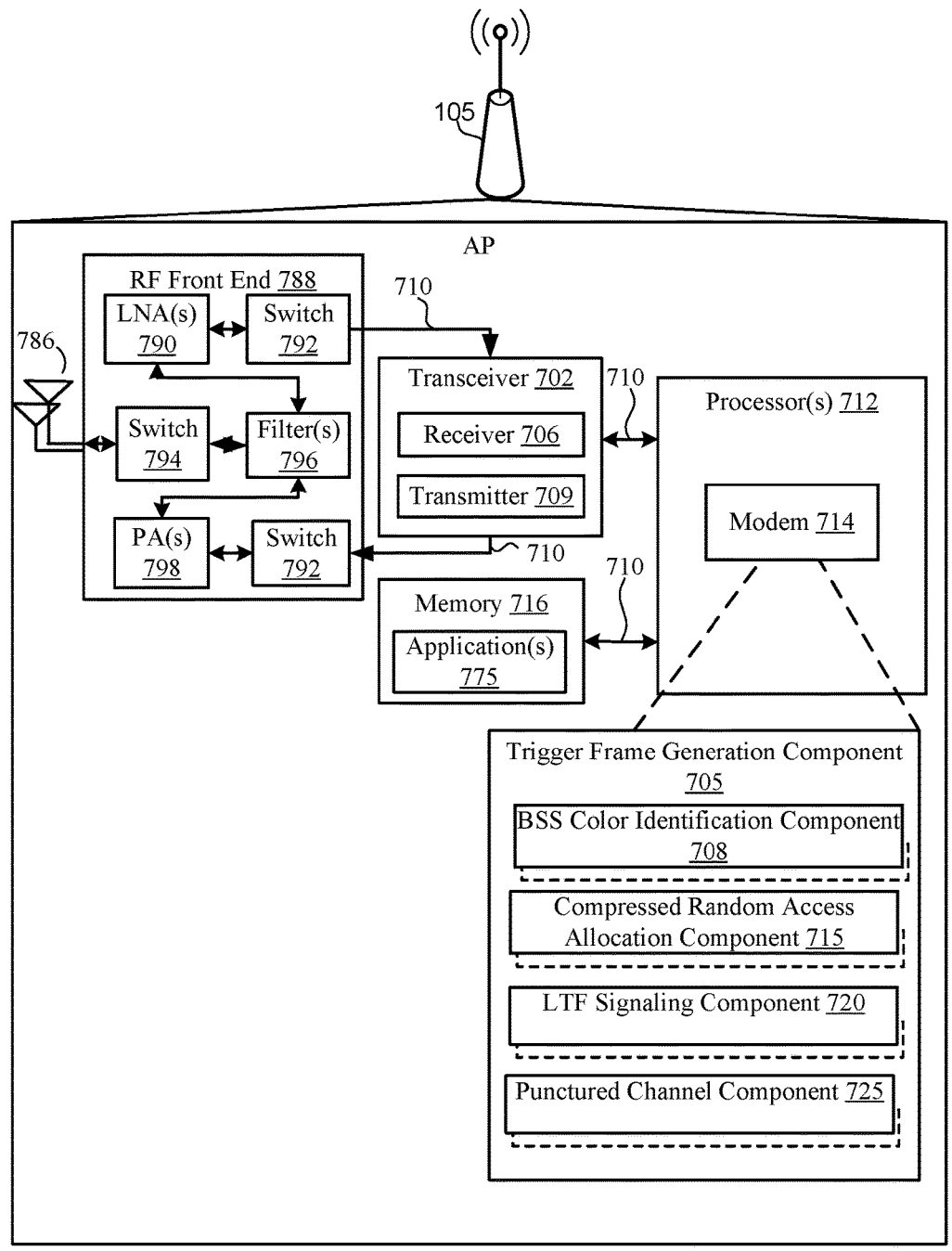
FIG. 7 describes one hardware example of an implementation of an AP that may include a variety of components.

FIG. 7 describes one example of an implementation of an AP 105 that may include a variety of components, some of which have already been described above, but including components such as one or more processors 712 and memory 716 and transceiver 702 in communication via one or more buses 744, which may operate in conjunction with trigger frame generation component 705 to enable one or more of the functions described herein related to including one or more methods of the present disclosure. Further, the one or more processors 712, modem 714, memory 716, transceiver 702, RF front end 788 and one or more antennas 786, may be configured to support voice and/or data calls (simultaneously or non-simultaneously) in one or more radio access technologies.

In an aspect, the one or more processors 712 can include a modem 714 that uses one or more modem processors. The various functions related to trigger frame generation component 705 may be included in modem 714 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 714 associated with trigger frame generation component 705 may be performed by transceiver 702.

As noted above, the trigger frame generation component 705 may include a compressed random access allocation component 715 and LTF signaling component 720. The trigger frame generation component 705 may further include a punctured channel component 725 to signal the one or more punctured channels by the AP to the STA. Although the methods of FIGS. 5, 6A, and 6B are described as separate, it is contemplated that features of signaling allocation of a plurality of random access resource units via a single per-user information field and LTF signaling (e.g., identifying whether the allocated resources are a single user resource allocation units or multi-user resource allocation units) may be performed together. Thus, in some examples, features described with reference to FIGS. 5, 6A, and 6B of methods 500,600, and 650 (and more particularly blocks 510 and 610) may performed in one implementation.

Memory 716 may be configured to store data used herein and/or local versions of applications 775 or trigger frame generation component 705 and/or one or more of its subcomponents being executed by at least one processor 712. Memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining trigger frame generation component 705 and/or one or more of its subcomponents.

Transceiver 702 may include at least one receiver 706 and at least one transmitter 709. Receiver 706 may include hardware, firmware, and/or software code executable by a processor for receiving data, the code comprising instructions and being stored in a memory (e.g., computer-readable medium). Receiver 706 may be, for example, a radio frequency (RF) receiver. In an aspect, receiver 706 may receive signals transmitted by at least one STA 115. Additionally, receiver 706 may process such received signals, and also may obtain measurements of the signals, such as, but not limited to, Ec/Io, SNR, RSRP, RSSI, etc. Transmitter 709 may include hardware, firmware, and/or software code executable by a processor for transmitting data, the code comprising instructions and being stored in a memory (e.g., computer-readable medium). A suitable example of transmitter 709 may including, but is not limited to, an RF transmitter.

Moreover, in an aspect, AP 105 may include RF front end 788, which may operate in communication with one or more antennas 786 and transceiver 702 for receiving and transmitting radio transmissions, for example, wireless communications transmitted by at least one STA 115 or wireless transmissions transmitted by another AP 105. RF front end 788 may be connected to one or more antennas 786 and can include one or more low-noise amplifiers (LNAs) 790, one or more switches 792 and 794, one or more power amplifiers (PAs) 798, and one or more filters 796 for transmitting and receiving RF signals.

In an aspect, LNA 790 can amplify a received signal at a desired output level. In an aspect, each LNA 790 may have a specified minimum and maximum gain values. In an aspect, RF front end 788 may use one or more switches 792 to select a particular LNA 790 and its specified gain value based on a desired gain value for a particular application.

Further, for example, one or more PA(s) 798 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and its specified gain value based on a desired gain value for a particular application.

Also, for example, one or more filters 796 can be used by RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, RF front end 788 can use one or more switches 792, 794 to select a transmit or receive path using a specified filter 796, LNA 790, and/or PA 798, based on a configuration as specified by transceiver 702 and/or processor 712.

As such, transceiver 702 may be configured to transmit and receive wireless signals through one or more antennas 786 via RF front end 788. In an aspect, transceiver may be tuned to operate at specified frequencies such that AP 105 can communicate with, for example, one or more STAs 115 or one or more cells associated with one or more APs 105. In an aspect, for example, modem 714 can configure transceiver 702 to operate at a specified frequency and power level based on the AP configuration of the AP 105 and the communication protocol used by modem 714.

In an aspect, modem 714 can be a multiband-multimode modem, which can process digital data and communicate with transceiver 702 such that the digital data is sent and received using transceiver 702. In an aspect, modem 714 can be multiband and be configured to support multiple frequency bands for a specific communications protocol. In an aspect, modem 714 can be multimode and be configured to support multiple operating networks and communications protocols. In an aspect, modem 174 can control one or more components of AP 105 (e.g., RF front end 788, transceiver 702) to enable transmission and/or reception of signals from the network based on a specified modem configuration. In an aspect, the modem configuration can be based on the mode of the modem and the frequency band in use.

Figure 8:
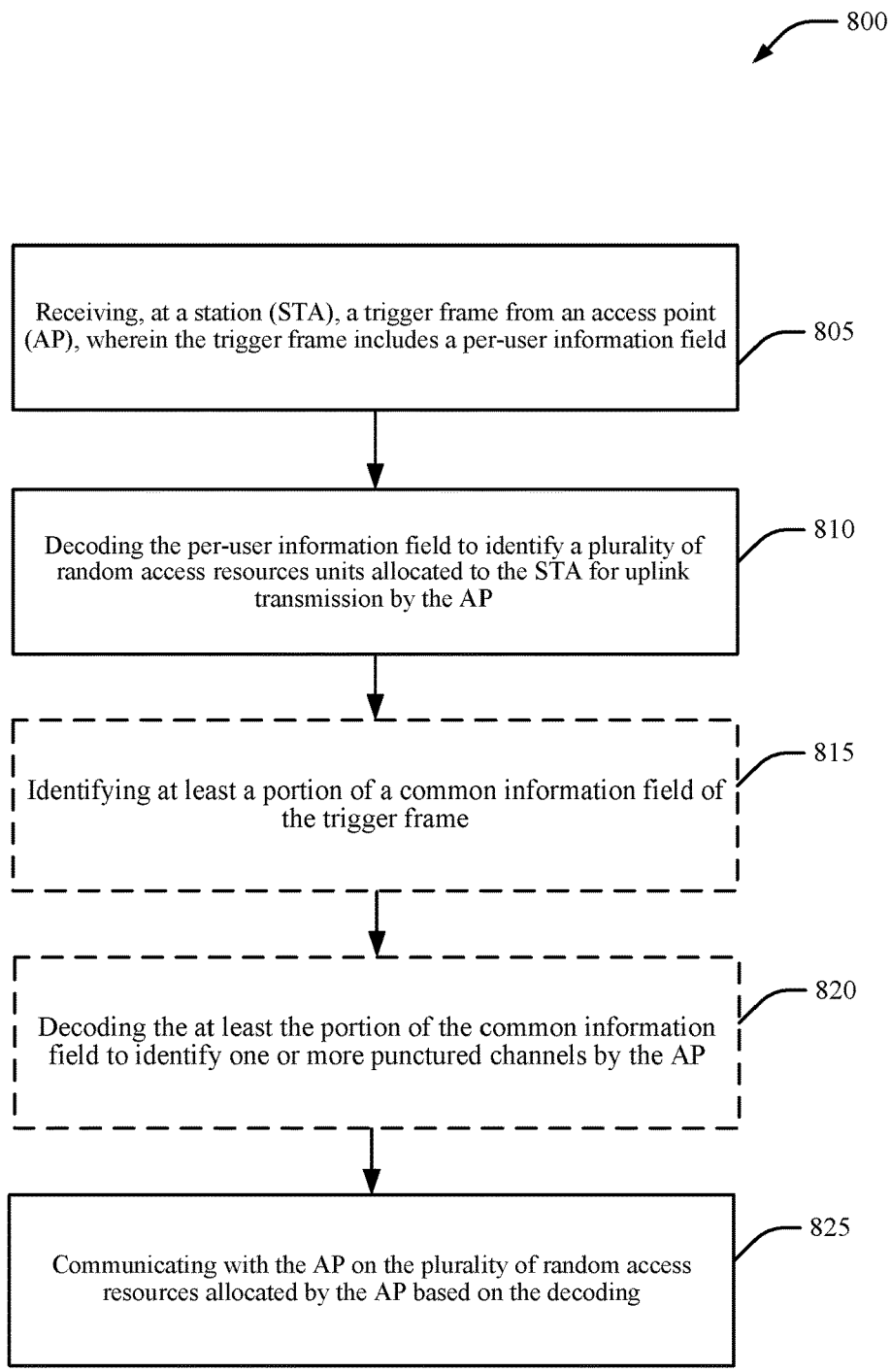
FIG. 8 is a flowchart of an example method of decoding a trigger frame, at a STA, with compressed per-user information field for random access allocations.

FIG. 8 is a flowchart of an example method 800 of decoding a trigger frame with compressed per-user information field for random access allocations. The method 800 may be performed by an STA 115 as described with reference to FIGS. 1, 2, and 12. Although the method 800 is described below with respect to the elements of the STA 115, other components may be used to implement one or more of the steps described herein.

At block 805, the method may include receiving, at a STA, a trigger frame from an AP, wherein the trigger frame includes a per-user information field. In some examples, the trigger frame may also include a common information field. In some aspects, the trigger frame may be received in response to the STA transmitting a buffer status report to the AP signaling that the STA has data for transmission to the AP. Aspects of block 805 may be performed by a transceiver 1002 (and receiver 1006) in combination with the modem 1014 described with reference to FIG. 12.

At block 810, the method may include decoding the per-user information field to identify a plurality of random access resource units allocated to the STA for uplink transmission by the AP. In some examples, decoding the per-user information field to identify the plurality of random access resource units allocated to the STA for uplink transmission by the AP may comprise decoding a single per-user information field in the trigger frame that identifies information associated with a plurality of random access resource units. The plurality of random access resource units may be consecutive K number of resource units of equal size, wherein K may be an integer (e.g., K=1, 2, 3, . . . 50 . . . etc.). In some aspects, the STA may decode a value of K from a resource unit count allocation subfield (see FIG. 3B, RU Allocation 320) in the per-user information field of the trigger frame, wherein the resource unit count subfield may be a repurposed spatial stream allocation subfield of a trigger frame. In some examples, decoding the per-user information field to identify the plurality of random access resource units allocated to the STA for uplink transmission by the AP may further comprise decoding a starting index of the plurality of random access resource units from a resource unit allocation subfield in the per-user information field of the trigger frame. Aspects of block 810 may be performed by LTF signaling decoding component 1020 described with reference to FIG. 12.

At block 815, the method optionally include identifying at least a portion of a common information field of the trigger frame. Aspects of block 815 may be performed by channel decoding component 1025 described with reference to FIG. 12.

At block 820, the method optionally include decoding the at least the portion of the common information field to identify one or more punctured channels by the AP. In some aspects, the method may include decoding a portion of a spatial reuse subfield (see FIG. 3A, element 330) to identify whether spatial reuse transmission is disallowed. Aspects of block 820 may be performed by the channel decoding component 1025 described with reference to FIG. 12.

At block 825, the method may include communicating with the AP on the plurality of random access resources allocated by the AP based on the decoding. Aspects of the block 825 may be performed by combination of the modem 1014 and transceiver 1002 described with reference to FIG. 12.

Figure 9:
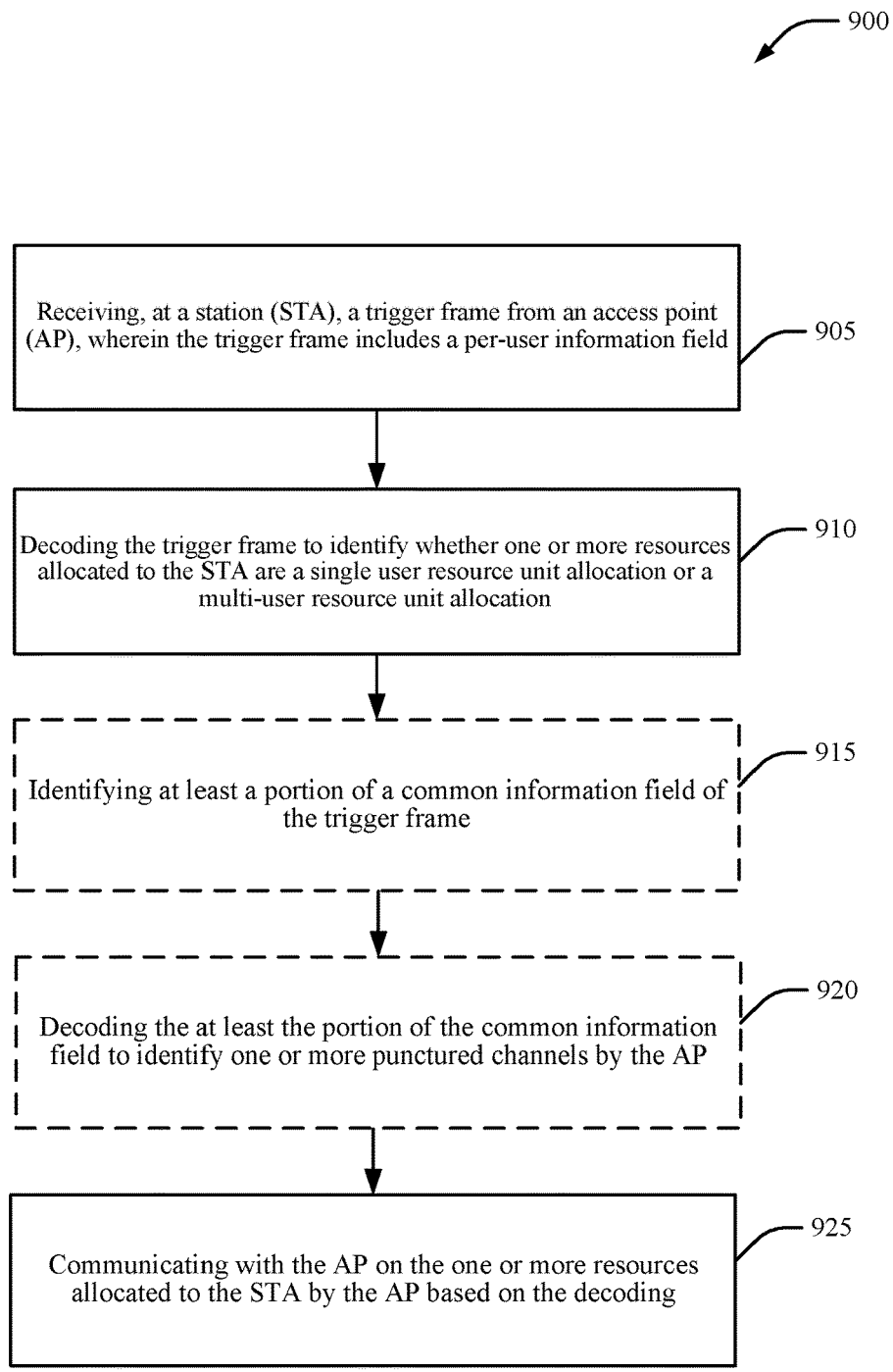
FIG. 9 is a flowchart of an example method of decoding a trigger frame, at the STA, with LTF mode signaling that identifies whether one or more resources allocated to the STA are either single user resource allocation units or multi-user resource allocation units.

FIG. 9 is a flowchart of an example method 900 of decoding a trigger frame with LTF mode signaling that identifies whether one or more resources allocated to the STA are either single user resource allocation units or multi-user resource allocation units. The method 900 may be performed by an STA 115 as described with reference to FIGS. 1, 2, and 12. Although the method 900 is described below with respect to the elements of the STA 115, other components may be used to implement one or more of the steps described herein.

At block 905, the method may include receiving, at a STA, a trigger frame from an AP, wherein the trigger frame includes a per-user information field. Similar to FIG. 8, in some examples, the trigger frame may also include a common information field. In some aspects, the trigger frame may be received in response to the STA transmitting a buffer status report to the AP signaling that the STA has data for transmission to the AP. Aspects of block 905 may be performed by a transceiver 1002 (and receiver 1006) in combination with the modem 1014 described with reference to FIG. 12.

At block 910, the method may include decoding the trigger frame to identify whether one or more resources allocated to the STA are a single user resource unit allocation or a multi-user resource unit allocation. In some examples, this may be determined based on decoding a common information field (and more particularly the MU MIMO LTF Mode subfield (see FIG. 3A, element 315) of the trigger frame to identify a MU MIMO LTF mode (e.g., masked LTF sequence or single stream pilots). Thus, the MU MIMO LTF mode may be indicated as a single-stream pilot based on a determination that at least one of the one or more resources allocated to the at least one STA is a single-user resource unit allocation. Alternatively, the MU MIMO LTF mode may be indicated as a masked LTF sequence based on determining that none of the one or more resources allocated to the at least one STA are a single-user resource unit allocation.

In other examples, decoding the trigger frame to identify whether the one or more resources allocated to the STA are the single user resource unit allocation or the multi-user resource unit allocation may comprise decoding a bit value (see FIG. 4) of a resource unit allocation subfield (see FIG. 3B, element 320) in a per-user information field of the trigger frame to signal whether the one or more resources allocated to the STA are the single user resource unit allocation or the multi-user resource unit allocation. Additionally or alternatively, the STA may decode an additional configurable bit (e.g., a bit added by the AP in the trigger frame either before or after the user identifier) to a per-user information field of the trigger frame that indicates whether the one or more resources allocated include the single user resource unit allocation or the multi-user resource unit allocation. Aspects of block 910 may be performed by LTF signal decoding component 1020 described with reference to FIG. 12.

At block 915, the method optionally include identifying at least a portion of a common information field of the trigger frame. Aspects of block 915 may be performed by channel decoding component 1025 described with reference to FIG. 12.

At block 920, the method optionally include decoding the at least the portion of the common information field to identify one or more punctured channels by the AP. In some aspects, the method may include decoding a portion of a spatial reuse subfield (see FIG. 3A, element 330) to identify whether spatial reuse transmission is disallowed. Aspects of block 920 may be performed by the channel decoding component 1025 described with reference to FIG. 12.

At block 925, the method may include communicating with the AP on the one or more resources allocated to the STA by the AP based on the decoding. Aspects of the block 915 may be performed by combination of the modem 1014 and transceiver 1002 described with reference to FIG. 12.

Figure 10:
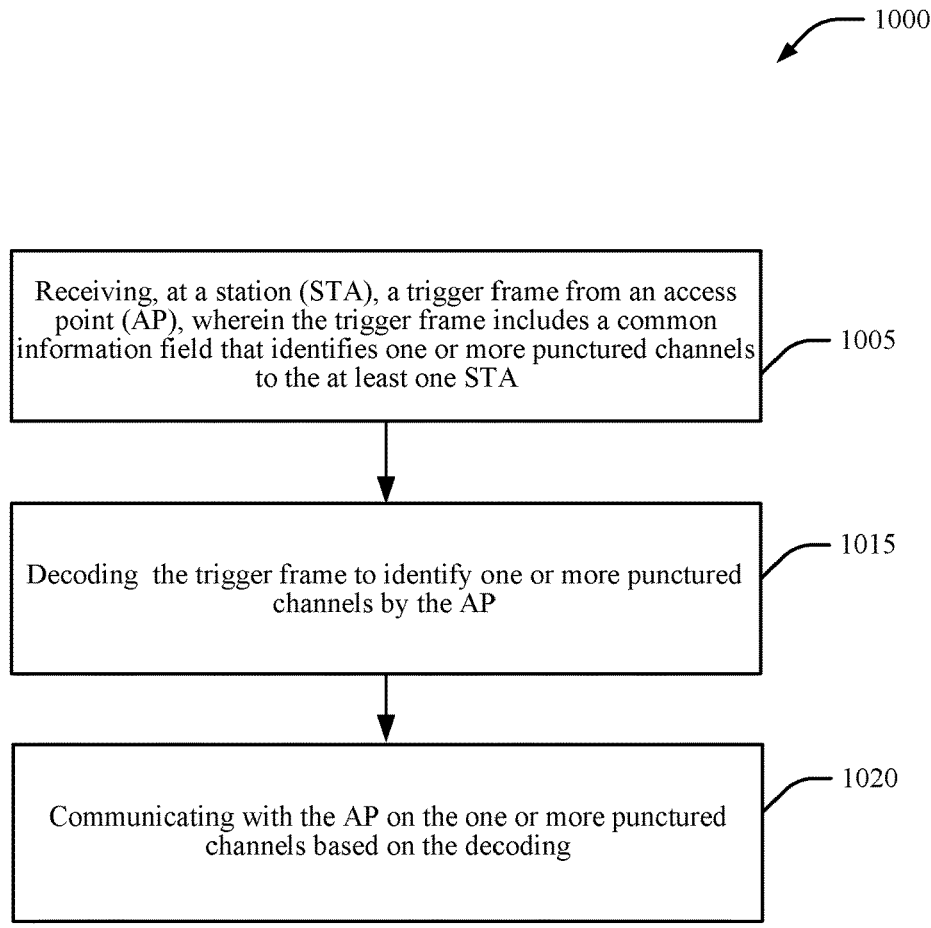
FIG. 10 is a flowchart of an example method of decoding the trigger frame to identify one or more punctured channels by the AP.

FIG. 10 is a flowchart of an example method 1000 of decoding a trigger frame to identify one or more punctured channels. The method 1000 may be performed by an STA 115 as described with reference to FIGS. 1, 2, and 12. Although the method 1000 is described below with respect to the elements of the STA 115, other components may be used to implement one or more of the steps described herein.

At block 1005, the method may include receiving, at a STA, a trigger frame from an AP. In some aspects, the trigger frame may include a common information field that identifies one or more punctured channels to the at least one STA. Aspects of block 1005 may be performed by a transceiver 1002 (and receiver 1006) in combination with the modem 1014 described with reference to FIG. 12.

At block 1015, the method may include decoding at least a portion of a common information field of the trigger frame to identify one or more punctured channels by the AP. Aspects of block 1015 may be performed by channel decoding component 1025 in combination with the modem 1014 described with reference to FIG. 12.

At block 1020, the method may include communicating with the AP on the one or more punctured channels based on decoding. Aspects of the block 1015 may be performed by combination of the modem 1014 and transceiver 1002 described with reference to FIG. 12.

Figure 11:
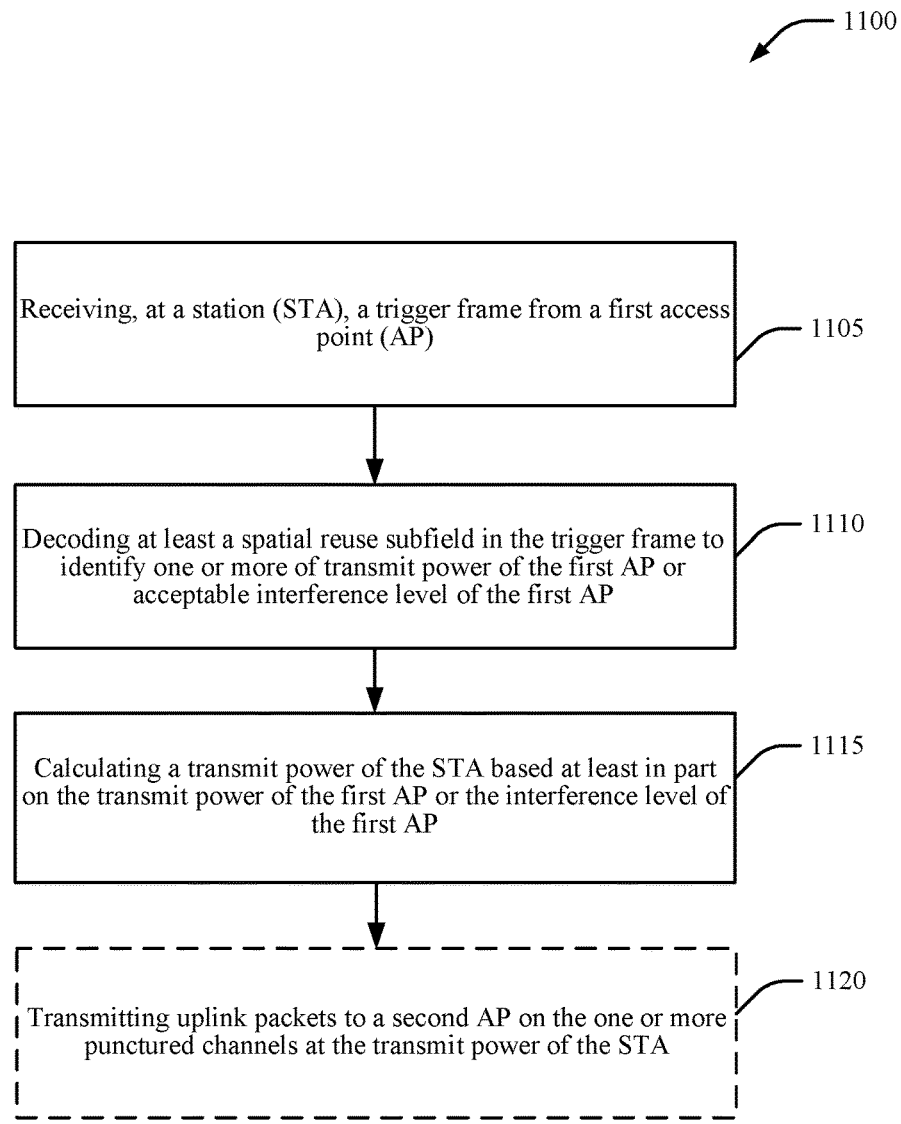
FIG. 11 is a flowchart of an example method of decoding the trigger frame to identify one or more punctured channels by the AP.

FIG. 11 is a flowchart of an example method 1100 of controlling the transmit power of the STA. The method 1100 may be performed by an STA 115 as described with reference to FIGS. 1, 2, and 12. Although the method 1100 is described below with respect to the elements of the STA 115, other components may be used to implement one or more of the steps described herein.

At block 1105, the method may include receiving, at a station (STA), a trigger frame from a first AP. In some aspects, the trigger frame may include a bandwidth field that identifies available bandwidth and a set of spatial reuse bits that identifies a subband from the available bandwidth for spatial reuse transmission. Aspects of block 1105 may be performed by a transceiver 1002 (and receiver 1006) in combination with the modem 1014 described with reference to FIG. 12.

At block 1110, the method may include decoding at least a spatial reuse subfield in the trigger frame to identify one or more of transmit power of the first AP or acceptable interference level of the first AP. In some examples, decoding a portion of the spatial reuse subfield of at least a portion of a common information field may identify whether spatial reuse transmission is disallowed. The spatial reuse subfield may be included in a common information field of the trigger frame. In some examples, decoding of the trigger frame may also allow the STA to identify an unused channel to the STA based on decoding at least the spatial resuse subfield of the trigger frame. Aspects of block 1110 may be performed by channel decoding component 1025 in combination with the modem 1014 described with reference to FIG. 12.

At block 1115, the method may include calculating a transmit power of the STA based at least in part on the transmit power of the first AP or the interference level of the first AP. Aspects of block 1115 may also be performed by trigger frame decoding component 1005 described with reference to FIG. 12.

At block 1125, the method may include transmitting uplink packets to a second AP on the one or more punctured channels at the transmit power of the STA. Aspects of block 1125 may be performed by transceiver 1202 described with reference to FIG. 12.

Figure 12:
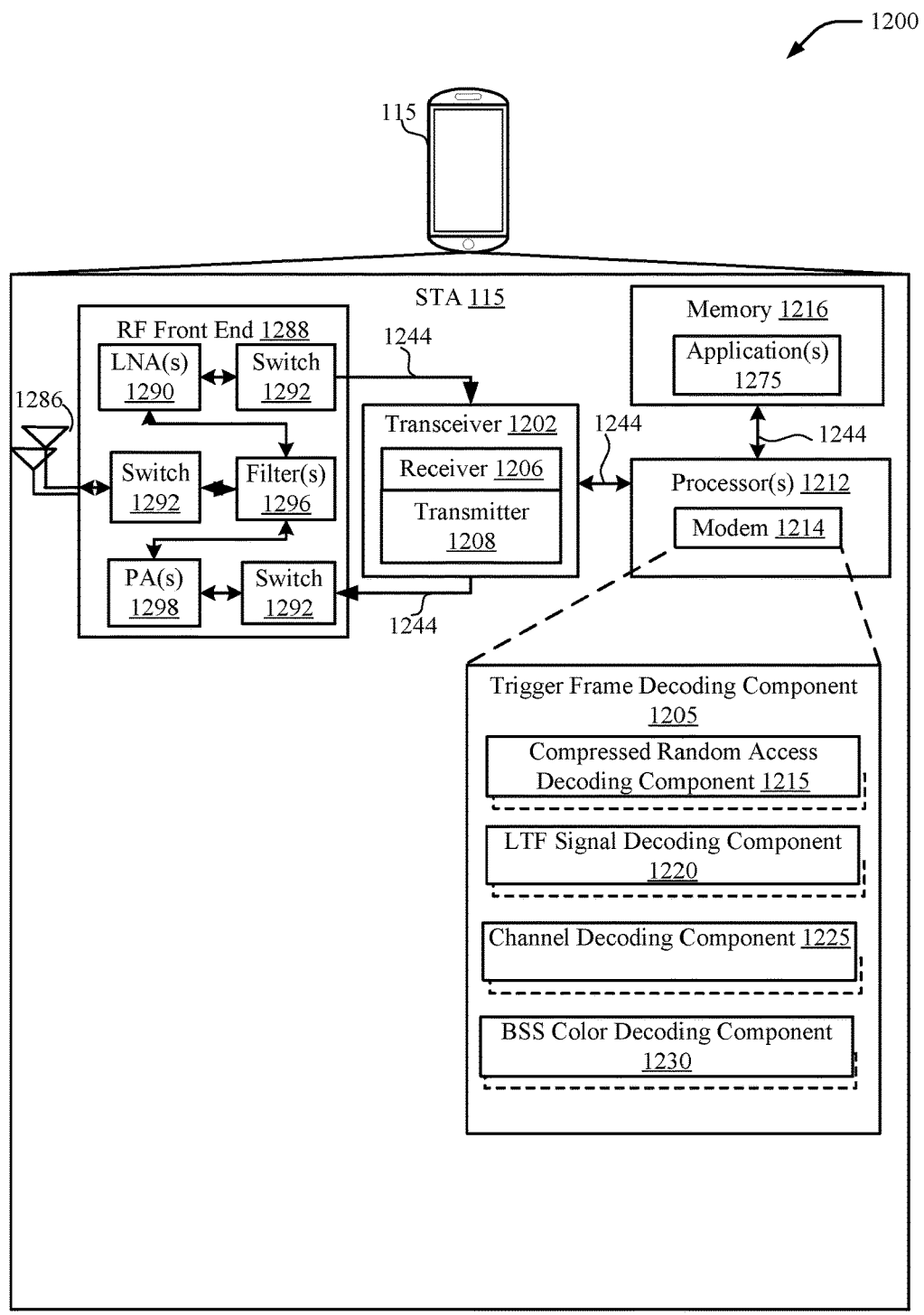
FIG. 12 describes one hardware example of an implementation of a STA that may include a variety of components.

FIG. 12 describes one example of an implementation of a STA 115 that may include a variety of components, some of which have already been described above, but including components such as one or more processors 1212 and memory 1216 and transceiver 1202 in communication via one or more buses 1244, which may operate in conjunction with trigger frame decoding component 1205 to enable one or more of the functions described herein related to including one or more methods of the present disclosure. Further, the one or more processors 1212, modem 1214, memory 1216, transceiver 1002, RF front end 1288 and one or more antennas 1286, may be configured to support voice and/or data calls (simultaneously or non-simultaneously) in one or more radio access technologies.

In an aspect, the one or more processors 1212 can include a modem 1214 that uses one or more modem processors. The various functions related to trigger frame decoding component 1205 may be included in modem 1214 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 1214 associated with trigger frame decoding component 1005 may be performed by transceiver 1202.

As noted above, the trigger frame decoding component 1205 may include a compressed random access decoding component 1215 and LTF signal decoding component 1220. Although the methods of FIGS. 8 and 9 are described as separate, it is contemplated that features of signaling decoding of a plurality of random access resource units via a single per-user information field and LTF signal decoding (e.g., identifying whether the allocated resources are a single user resource allocation units or multi-user resource allocation units) may be performed together. Thus, in some examples, features described with reference to FIGS. 8 and 9 of method 800 and 900 (and more particularly blocks 810 and 910) may be performed in one implementation.

Memory 1216 may be configured to store data used herein and/or local versions of applications 1275 or trigger frame decoding component 1205 and/or one or more of its subcomponents being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining trigger frame decoding component 1205 and/or one or more of its subcomponents.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one AP 105. Additionally, receiver 1206 may process such received signals, and also may obtain measurements of the signals, such as, but not limited to, Ec/Io, SNR, RSRP, RSSI, etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, STA 115 may include RF front end 1288, which may operate in communication with one or more antennas 1286 and transceiver 1202 for receiving and transmitting radio transmissions, for example, wireless communications transmitted by at least one AP 105 or wireless transmissions transmitted by another STA 115. RF front end 1288 may be connected to one or more antennas 1286 and can include one or more low-noise amplifiers (LNAs) 1290, one or more switches 1292 and 1294, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1090 and/or PA 1298. In an aspect, RF front end 1288 can use one or more switches 1292, 1294 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1286 via RF front end 1288. In an aspect, transceiver may be tuned to operate at specified frequencies such that STA 115 can communicate with, for example, one or more APs 105 or one or more cells associated with one or more APs 105. In an aspect, for example, modem 1214 can configure transceiver 1202 to operate at a specified frequency and power level based on the AP configuration of the AP 105 and the communication protocol used by modem 1214.

In an aspect, modem 1214 can be a multiband-multimode modem, which can process digital data and communicate with transceiver 1202 such that the digital data is sent and received using transceiver 1202. In an aspect, modem 1214 can be multiband and be configured to support multiple frequency bands for a specific communications protocol. In an aspect, modem 1214 can be multimode and be configured to support multiple operating networks and communications protocols. In an aspect, modem 1274 can control one or more components of STAs 115 (e.g., RF front end 1288, transceiver 1202) to enable transmission and/or reception of signals from the network based on a specified modem configuration. In an aspect, the modem configuration can be based on the mode of the modem and the frequency band in use. The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (e.g., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
   receiving, at an apparatus, a trigger frame from an access point (AP), wherein the trigger frame includes a common information field;
   decoding the common information field of the trigger frame to identify a multi-user (MU) multiple-input and multiple-output (MIMO) long training field (LTF) mode, wherein the MU MIMO LTF mode is indicated as a masked LTF sequence or a single-stream pilot based on whether one or more resources allocated to the apparatus are a single user resource unit allocation or a multi-user resource unit allocation; and
   communicating with the AP on the one or more resources allocated to the apparatus by the AP based on the decoding the common information field of the trigger frame.

2. The method of claim 1, wherein the MU MIMO LTF mode is indicated as a single-stream pilot based on at least one of the one or more resources allocated to the apparatus being a single-user resource unit allocation.

3. The method of claim 1, wherein the MU MIMO LTF mode is indicated as a masked LTF sequence or a single-pilot stream based on none of the one or more resources allocated to the apparatus being a single-user resource unit allocation.

4. The method of claim 1, further comprising decoding a per-user information field of the trigger frame, wherein the decoding the per-user information field of the trigger frame comprises:
  decoding a bit value of a resource unit allocation subfield in the per-user information field of the trigger frame to identify whether the one or more resources allocated to the apparatus are the single user resource unit allocation or the multi-user resource unit allocation.

5. The method of claim 1, further comprising decoding a per-user information field of the trigger frame, wherein the decoding the per-user information field of the trigger frame comprises:
  decoding an additional configurable bit in the per-user information field of the trigger frame that indicates whether the one or more resources allocated include the single user resource unit allocation or the multi-user resource unit allocation.

6. The method of claim 1, further comprising:
  identifying at least a portion of a common information field of the trigger frame; and
  decoding the at least the portion of the common information field to identify one or more punctured channels by the AP.

7. The method of claim 6, further comprising:
  decoding a portion of a spatial reuse subfield of the at least the portion of the common information field to identify whether spatial reuse transmission is disallowed.

8. The method of claim 6, further comprising:
  determining a transmit power of the AP;
  determining an interference level of the AP;
  calculating a transmit power of the apparatus based at least in part on the transmit power of the AP and the interference level of the AP; and
  transmitting uplink packets to the AP on one or more non-punctured channels at the transmit power of the apparatus.

9. The method of claim 8, wherein the transmit power of the apparatus is determined based at least in part on downlink pathloss measurements of the trigger frame.

10. The method of claim 8, wherein the interference level of the AP is determined based on decoding of at least a portion of the trigger frame.

11. An apparatus for wireless communications, comprising:
  a memory configured to store instructions for processing trigger frames;
  a processor communicatively coupled with the memory, the processor configured to execute the instructions to:
    receive, at the apparatus, a trigger frame from an access point (AP), wherein the trigger frame includes a common information field;
    decode the common information field of the trigger frame to identify a multi-user (MU) multiple-input and multiple-output (MIMO) long training field (LTF) mode, wherein the MU MIMO LTF mode is indicated as a masked LTF sequence or a single-stream pilot based on whether one or more resources allocated to the apparatus are a single user resource unit allocation or a multi-user resource unit allocation; and
    communicate with the AP on the one or more resources allocated to the apparatus by the AP based on the decode of the common information field of the trigger frame.

12. The apparatus of claim 11, wherein the MU MIMO LTF mode is indicated as a single-stream pilot based on at least one of the one or more resources allocated to the apparatus being a single-user resource unit allocation.

13. The apparatus of claim 11, wherein the MU MIMO LTF mode is indicated as a masked LTF sequence or a single-pilot stream based on none of the one or more resources allocated to the apparatus being a single-user resource unit allocation.

14. The apparatus of claim 11, wherein the processor is further configured to execute the instructions to:
  decode a bit value of a resource unit allocation subfield in a per-user information field of the trigger frame to identify whether the one or more resources allocated to the apparatus are the single user resource unit allocation or the multi-user resource unit allocation.

15. The apparatus of claim 11, wherein the processor is further configured to execute the instructions to:
  decode an additional configurable bit in a per-user information field of the trigger frame that indicates whether the one or more resources allocated include the single user resource unit allocation or the multi-user resource unit allocation.

16. The apparatus of claim 11, wherein the processor is further configured to execute instructions to:
  identify at least a portion of a common information field of the trigger frame; and
  decode the at least the portion of the common information field to identify one or more punctured channels by the AP.

17. The apparatus of claim 16, wherein the processor is further configured to execute the instructions to:
  determine a transmit power of the AP;
  determine an interference level of the AP;
  calculate a transmit power of the apparatus based at least in part on the transmit power of the AP and the interference level of the AP; and
  transmit uplink packets to the AP on one or more non-punctured channels at the transmit power of the apparatus.

18. A wireless node for wireless communications, the wireless node comprising:
  a receiver configured to receive a trigger frame from an access point (AP), wherein the trigger frame includes a common information field;
  a memory configured to store instructions for wireless communications;
  a processor communicatively coupled with the memory, the processor configured to execute the instructions to:
    decode the common information field of the trigger frame to identify a multi-user (MU) multiple-input and multiple-output (MIMO) long training field (LTF) mode, wherein the MU MIMO LTF mode is indicated as a masked LTF sequence or a single-stream pilot based on whether one or more resources allocated to the wireless node are a single user resource unit allocation or a multi-user resource unit allocation; and
    communicate with the AP on the one or more resources allocated to the wireless node by the AP based on the decode of the common information field of the trigger frame.

* * * * *